United States Patent
Ishitobi et al.

(10) Patent No.: US 9,327,664 B2
(45) Date of Patent: May 3, 2016

(54) ENERGY ABSORBING MEMBER, METHOD FOR PRODUCING SAME, AND ELECTROMAGNETIC TUBE EXPANSION METHOD FOR RECTANGULAR CROSS-SECTION MEMBER AND POLYGON CROSS-SECTION MEMBER

(71) Applicant: Kobe Steel, Ltd., Kobe-shi (JP)

(72) Inventors: Hideki Ishitobi, Nagoya (JP); Hiroaki Hosoi, Kobe (JP); Keisuke Akasaki, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/376,054

(22) PCT Filed: Jan. 24, 2013

(86) PCT No.: PCT/JP2013/051489
§ 371 (c)(1),
(2) Date: Jul. 31, 2014

(87) PCT Pub. No.: WO2013/115066
PCT Pub. Date: Aug. 8, 2013

(65) Prior Publication Data
US 2014/0353990 A1    Dec. 4, 2014

(30) Foreign Application Priority Data

Feb. 1, 2012   (JP) .................................. 2012-020370
Oct. 2, 2012   (JP) .................................. 2012-220568

(51) Int. Cl.
*B60R 19/02*    (2006.01)
*B60R 19/34*    (2006.01)
(Continued)

(52) U.S. Cl.
CPC ................ *B60R 19/34* (2013.01); *B21D 19/12* (2013.01); *B21D 26/14* (2013.01); *B21D 53/88* (2013.01); *F16F 7/12* (2013.01)

(58) Field of Classification Search
CPC ........ B60R 19/34; B21D 19/12; B21D 26/14; B21D 53/88; F16F 7/12
See application file for complete search history.

(56) References Cited

U.S. PATENT DOCUMENTS

2006/0011434 A1 * 1/2006 Itou ........................... F16F 7/12
                                                  188/372
2008/0268276 A1 * 10/2008 Ueno .................... B21D 26/021
                                                  428/593

FOREIGN PATENT DOCUMENTS

JP          2-175452          7/1990
JP          6-31226           2/1994
(Continued)

OTHER PUBLICATIONS

International Search Report issued Apr. 16, 2013, in PCT/JP13/51489 filed Jan. 24, 2013.

*Primary Examiner* — Lori L Lyjak
(74) *Attorney, Agent, or Firm* — Oblon, McClelland, Maier & Neustadt, L.L.P.

(57) ABSTRACT

An end of a stay material made of a tubular aluminum alloy extruded material is expanded by electromagnetic molding to form a flange for producing a bumper stay. The flange width is increased without cracking and a decrease in the thickness. A stay material having a circumferential wall undulating in a waveform pattern is used. A circumferential length L (one round length along waveform pattern) of the outer periphery wall along the circumferential direction of the stay material is longer than a circumferential length $L_0$ of a simple cylindrical circumferential wall having the same outer diameter (circumscribed circle) ($L>L_0$). $L-L_0$ is an excessive line length. Since the circumferential wall has the excessive line length, when the end of the circumferential wall is expanded to form the flange, the flange having a large diameter can be formed.

22 Claims, 30 Drawing Sheets

(51) Int. Cl.
*F16F 7/12* (2006.01)
*B21D 19/12* (2006.01)
*B21D 26/14* (2006.01)
*B21D 53/88* (2006.01)

(56) References Cited

FOREIGN PATENT DOCUMENTS

| | | |
|---|---|---|
| JP | 6-312226 | 11/1994 |
| JP | 11-333526 A | 12/1999 |
| JP | 2004-189062 | 7/2004 |
| JP | 2004-189063 A | 7/2004 |
| JP | 2004-237818 | 8/2004 |
| JP | 2005-7475 | 1/2005 |
| JP | 2005-152920 | 6/2005 |
| JP | 2006-96229 A | 4/2006 |
| JP | 2006-160260 | 6/2006 |
| JP | 2006-207725 | 8/2006 |
| JP | 2006-305587 | 11/2006 |
| JP | 2008-149343 A | 7/2008 |
| JP | 2008-273271 | 11/2008 |
| JP | 2010-51974 | 3/2010 |
| JP | 2010-69927 | 4/2010 |
| JP | 2010-116129 | 5/2010 |
| JP | 2011-105183 | 6/2011 |

\* cited by examiner

| SIGN | A1 | A2 | A3 | A4 | A5 |
|---|---|---|---|---|---|
| CROSS-SECTIONAL SHAPE |  |  |  |  |  |
| OUTER CIRCUMFERENTIAL LENGTH (mm) | 282.7 | 357.5 | 357.6 | 357.1 | 357.1 |
| AXIAL LENGTH (mm) | 120 | 120 | 120 | 120 | 120 |
| DIE SHAPE | CROSS SECTION 92×92mm CORNER R 6 mm | CROSS SECTION 92×92mm CORNER R 6 mm | CROSS SECTION 92×92mm CORNER R 6 mm | CROSS SECTION 92×92mm CORNER R 6 mm | CROSS SECTION 92×92mm CORNER R 6 mm |

Fig.18

| SIGN | B1 | B2 | B3 | B4 | B5 |
|---|---|---|---|---|---|
| CROSS-SECTIONAL SHAPE | ⌀64, 3 [mm] | 99 × 64, 3 [mm] | 89.8 × 64, R20.2, R8, R3 [mm] | 77 × 64, R5, R3 [mm] | 90.5 × 64, R8, R3 [mm] |
| OUTER CIRCUMFERENTIAL LENGTH (mm) | 201.1 | 257.7 | 319.4 | 319.4 | 319.4 |
| AXIAL LENGTH (mm) | 120 | 120 | 120 | 120 | 120 |
| DIE SHAPE | CROSS SECTION 65×100mm CORNER R 6 mm | CROSS SECTION 65×100mm CORNER R 6 mm | CROSS SECTION 65×100mm CORNER R 6 mm | CROSS SECTION 65×100mm CORNER R 6 mm | CROSS SECTION 65×100mm CORNER R 6 mm |

ENERGY ABSORBING MEMBER, METHOD FOR PRODUCING SAME, AND ELECTROMAGNETIC TUBE EXPANSION METHOD FOR RECTANGULAR CROSS-SECTION MEMBER AND POLYGON CROSS-SECTION MEMBER

TECHNICAL FIELD

The present invention relates to an energy absorbing member such as bumper stays for absorbing collision energy at collision of automobiles and a method for producing the energy absorbing member, as well as an electromagnetic tube expansion method for a rectangular cross-section member and a polygon cross-section member.

BACKGROUND ART

In recent years, standards on passenger car collision and pedestrian protection have been tightened, while improvement of the fuel efficiency and kinematic performances has been demanded. For example, a higher strength of bumper reinforces (bumper reinforcement), a higher energy absorbing efficiency and a lighter weight of bumper stays (crash box), and a higher energy absorbing efficiency of pedestrian protective components (see JP 2011-105183 A) are in increasing demand. For trucks, to prevent a passenger car from underrunning, collision strength standards for front and rear underrun protectors (see JP 2008-273271 A) are tightened, and on the other hand, due to an increase in laden weight, higher energy absorbing efficiency and a lighter weight of the underrun protectors and underrun protector stays have been demanded.

For the improvement of the energy absorbing efficiency, weight reduction, the reduction of the number of components, and simplification of a bonding method, there is provided a longitudinal-collapse-type bumper stay having a flange formed by applying electromagnetic molding at one or both ends of a light-weighted tubular aluminum alloy extruded material (or an aluminum alloy plate molded into a tube) (see JP 2010-116129 A, JP 2010-69927 A, JP 2006-305587 A, JP 2005-152920 A, JP 2005-7475 A, JP 2004-189062 A).

The diameter and thickness of the aluminum alloy extruded material is determined depending on a predetermined energy absorbing amount that should be absorbed using the bumper stay at collision. However, since the flange is expanded by tube expansion through electromagnetic molding, when the tube expansion rate (circumferential length after tube expansion/original circumferential length) is large, a crack may occur on the outer circumference of the flange, or the thickness may decrease, there is a limit in the width of the flange formed by electromagnetic molding.

Specifically, applied to mold various energy absorbing members such as bumper stays is an electromagnetic molding method of disposing a metal tubular material made of an aluminum alloy in a die having the inner circumferential face with a circular or polygonal cross section, inserting an electromagnetic molding coil into the metal tubular material, passing a large current through the electromagnetic molding coil in this state, inducing an induction current in the metal tubular material by electromagnetic inductive phenomenon, thereby causing an electromagnetic force according to Fleming's left-hand rule to expand the metal tubular material into a cross-sectional shape along the inner circumferential face and/or end face of the die.

For example, JP 2004-189062 A discloses that an end of an aluminum alloy tubular material is expanded to mold a bumper stay with a flange. JP 2004-237818 A describes that a front portion of an aluminum alloy tubular material is inserted into a through hole in a bumper reinforce, the periphery of a rear portion is surrounded with a die, and the whole length of the aluminum alloy tubular material is expanded to be swaged to the bumper reinforce. JP 2010-69927 A discloses that a rear portion of an aluminum alloy tubular material is expanded in first tube expansion while forming a flange in the rear end thereof, and a front portion is inserted into a through hole in a bumper reinforce in second tube expansion to swage the bumper reinforce. JP H6-31226 A discloses that an aluminum alloy tubular material having a circular cross section is expansion-molded into the material having an oddly-shaped cross section including polygonal cross section.

SUMMARY OF THE INVENTION

Problems to be Solved by the Invention

In tubular aluminum alloy extruded materials, a limit value of the moldable flange width is commonly 20 to 30% of the diameter of the material and thus, when the material diameter is small, the flange width necessary for fastening bolts cannot be ensured. Further, in fastening a bumper stay to a side member, even when the flange width necessary for fastening the bolts can be ensured in the bumper stay, some or all of bolt fastening positions with respect to the side member may not be set within the moldable flange width of the bumper stay.

As means for solving the above-mentioned problem, a separate component (flange) can be swaged to the tube end by electromagnetic molding (see JP 2005-152920 A), or they can be bonded to each other by arc welding, which increases the number of components and steps to increase the weight and costs of the bumper stay. Although the number of bolts can be reduced or the diameter of the bolt can be decreased, a sufficient fastening strength cannot be ensured in such case.

The present invention is devised in consideration of the above-mentioned problems associated with the conventional art, and its main object is that, when an end of a tubular aluminum alloy extruded material is expanded by a processing means such as electromagnetic molding to form a flange, thereby producing an energy absorbing member such as a bumper stay, the flange width can be increased without generating any crack and decreasing its thickness.

In the tube expansion by electromagnetic molding, a circular cross-section coil helically wound around a hollow rectangular cross-section conductor with a uniform diameter is used as an electromagnetic molding coil. This circular cross-section coil can be easily molded, and an insulating resin layer around the conductor is resistant to damage due to repeated repulsion forces at electromagnetic molding. Further, since the force of electromagnetic molding is inversely proportional to the third power of the distance between the aluminum alloy material and the electromagnetic molding coil, the aluminum alloy material having the circular cross section is used so as to minimize the gap between the aluminum alloy material and the electromagnetic molding coil.

When a rectangular cross-section member is electromagnetically molded using the electromagnetic molding coil and the aluminum alloy material as described in JP 2004-189062 A, R (radius) of each corner of the rectangular cross-section member cannot be disadvantageously molded to be small due to limitation of the electromagnetic molding force, durability of the electromagnetic molding coil, and limitation of extension of the material. This will be described below with reference to FIGS. 34 to 36.

First, in FIG. 34(a), a cylindrical aluminum alloy material 201 is disposed in a die 203 having the inner circumferential face with a rectangular cross section (square in this example), and an electromagnetic molding coil 202 having a circular cross section is disposed in the aluminum alloy material 201. R of the inner circumferential face of each corner 203a of a die 203 is formed to be relatively small so as to correspond to the cross-sectional shape of the target rectangular cross-section member.

The aluminum alloy material 201 is expanded by passing a current through the electromagnetic molding coil 202 in the state shown in FIG. 34(a). At this time, when the aluminum alloy material 201 is deformed (expanded) to reach the corners 203a of the inner circumferential face of the die 203, the molded rectangular cross-section member has a target cross-sectional shape 205 expressed by a chain double-dashed line in FIG. 34(b). However, it is commonly difficult to mold such rectangular cross-section member having small R of corners, like the target cross-sectional shape 205, and as expressed by a solid line in FIG. 34(b), an actually-molded rectangular cross-section member 204 has a larger R of each corner 204a than each corner 205a of the target cross-sectional shape 205 (shape along the inner circumferential face of the die 203). That is, the aluminum alloy material 201 is not deformed (expanded) to reach the corners 203a of the inner circumferential face of the die 203.

In this tube expansion, if large electric energy is applied to the electromagnetic molding coil 202, causing a sufficiently large electromagnetic molding force in the aluminum alloy material 201, the aluminum alloy material 201 can be deformed (expanded) to reach the inner circumferential faces of the corners 203a of the die 203, achieving the rectangular cross-section member having small R of each corner. However, large electric energy lowers the durability of the electromagnetic molding coil 202. The circumferential length of the aluminum alloy material 201 largely changes (extends) in the vicinity of the corners 203a of the die 203, leading to local reduction of the thickness of the rectangular cross-section member at the corners, in turn, breakage. Accordingly, when the rectangular cross-section member is electromagnetically molded using the current electromagnetic molding coil and aluminum alloy material, as shown in FIG. 34(b), it is commonly difficult to make R of the corners 204a small as expected.

In FIG. 35, a cylindrical aluminum alloy material 211 is disposed in a die 213, an electromagnetic molding coil 212 having a circular cross section is disposed in the aluminum alloy material 211, and a current is passed through the electromagnetic molding coil 212 in this state to expand the aluminum alloy material 211. The die 213 has an inner circumferential face of rectangular cross section (square in this example), has a large cross-section part 213A and a small cross-section part 213B along the length, and a stepped part 213C is formed between the cross-section parts 213A and 213B. Through electromagnetic molding, as shown in FIG. 36, a rectangular cross-section member (bumper stay) 214 including a large cross-section part 214A, a small cross-section part 214B, and a stepped part 214C therebetween is molded.

Also in this example, due to limitation of the electromagnetic molding force, durability of the electromagnetic molding coil, and limitation of the material extension, the target cross-sectional shape (shape along the inner circumferential face of the die 213) cannot be achieved, and in an actually-molded rectangular cross-section member 214, R of each corner of the large cross-section part 214A, the small cross-section part 214B, and the stepped part 214C becomes larger than R of each corner of the target cross-sectional shape.

As shown in FIG. 36, in the bumper stay 214, the small cross-section part 214B is inserted into the cross section of a side member 215 expressed by a chain double-dashed line, the stepped part 214C contacts a flange 215A at the front end of the side member 215, and the small cross-section part 214B is fastened to the side member 215 with bolts, thereby fixing the bumper stay 214 to the side member 215. A load exerted on the bumper stay 214 at collision is transmitted from the large cross-section part 214A of the bumper stay 214 to the side member 215 via the flange 215A. The side member commonly has a small R of each corner, and has a polygon (rectangular to octagonal) cross section with clear ridges. Similarly, the side member 215 has a small R of each corner 215a, and has a square cross section with clear ridges.

Accordingly, as shown in FIG. 36(a), corners 214a of the large cross-section part 214A of the bumper stay 214 and corners 215a of the side member 215 do not coincide with each other when viewed in the axial direction. For this reason, the load exerted onto the bumper stay 214 at collision cannot be transmitted from the corners 214a of the large cross-section part 214A to the corners 215a of the side member 215, resulting in problems that the deformed shape of the bumper stay 214 becomes unstable, or the load due to deformation largely changes, and therefore, a predetermined energy absorbing performance cannot be ensured.

The present invention is devised in consideration of the above-mentioned problems of the conventional electromagnetic molding method, and a second object is that, when an aluminum alloy material having a tubular circumferential wall is expanded by electromagnetic molding to mold a polygon cross section member, R of each corner of the cross section is minimized.

Means for Solving the Problems

An energy absorbing member according to the present invention is molded from a tubular material including a circumferential wall undulating in a waveform pattern in the circumferential direction, a circumferential length equivalent circle diameter of the outer periphery of the circumferential wall being larger than a diameter of a minimum circumscribed circle, and the energy absorbing member includes an axial part having a tubular circumferential wall undulating in a waveform pattern in the circumferential direction, and one or two flanges formed by expanding the entire circumference of one or both ends of the circumferential wall of the metal molding material.

According to the present invention, the metal molding material means a metal member having the substantially uniform cross section in the longitudinal direction. Examples of the tubular material include a tubular extruded material, and a plate member shaped into a tube, and an aluminum alloy extruded material is the most desirable.

Undulating in the waveform pattern means that irregularities are repeated in the circumferential direction. The waveform can have various patterns such as sinusoidal waveform, triangular waveform, gear-like waveform, and their combinations.

That the circumferential length equivalent circle diameter of the outer periphery of the circumferential wall is larger than the diameter of the minimum circumscribed circle means that the circumferential length (length of one round along the undulation in the waveform pattern) of the outer periphery of the circumferential wall in the circumferential direction is larger than the circumferential length of a simple cylindrical circumferential wall having the same outer diameter (the diameter of the minimum circumscribed circle).

The energy absorbing member can be produced by using a tubular material having a circumferential wall undulating in a waveform pattern in the circumferential direction, a circumferential length equivalent circle diameter of the outer periphery of the circumferential wall being larger than a diameter of a minimum circumscribed circle, as a raw material, and expanding the entire circumference of an end of the circumferential wall by plastic working to form a flange. The whole or a part of the plastic working can be implemented by electromagnetic molding.

Although the cross-sectional shape of the original metal molding material can be kept unchanged without substantially increasing the place corresponding to the axial part of the energy absorbing member, expanding the axial part with an appropriate tube expansion rate simultaneously with the molding of the flange falls within the present invention. In the latter case, unlike the circumferential wall of the metal molding material as the raw material, the circumferential wall of the axial part need not undulate in a waveform pattern. For example, when the circumferential wall of the metal molding material undulates in the sinusoidal waveform pattern, the waveform pattern of the circumferential wall of the axial part can be changed to the triangular waveform pattern by the tube expansion.

An electromagnetic tube expansion method for rectangular cross-section member according to the present invention is an improvement of an electromagnetic molding method for rectangular cross-section member, the method including: disposing a metal tubular material having a tubular circumferential wall in a die having a substantially rectangular cross section with an inner circumferential face of an aspect ratio of 1:1.2 or more; disposing a cylindrical electromagnetic molding coil with a helically wound conductor in the metal tubular material; and passing a current through the electromagnetic molding coil in this state to expand the metal tubular material into a cross-sectional shape along the inner circumferential face of the die, and is particularly characterized by the cross-sectional shape of the metal tubular material and arrangement of the metal tubular material in the die.

Specifically, the cross section of the circumferential wall of the metal tubular material includes two opposed convex curved regions, two opposed nearly linear regions, and four irregular regions connecting the convex curved regions to the nearly linear regions, the convex curved regions being arranged substantially along the curvature of the outer periphery of the electromagnetic molding coil, the irregular regions each have a depression connected to the convex curved region and a projection connected to the nearly linear region, the convex curved regions are disposed as opposed to long sides of the cross section of the die, and the nearly linear regions are disposed as opposed to short sides of the cross section of the die.

According to the electromagnetic molding method, the metal tubular material may be expanded, and one or both of ends of the metal tubular material may be expanded outward at the same time to form a flange.

According to the electromagnetic molding method, the rectangular cross-section member is, for example, an energy absorbing member that is crushed and deformed when receiving a compressive load in the axial direction to absorb energy. When the rectangular cross-section member is such energy absorbing member, the metal tubular material may be expanded, and a plurality of inwardly-recessed crash beads (portions having a smaller expansion amount become recesses) may be formed at the same time. This energy absorbing member is suitable for use in automobiles.

According to the electromagnetic molding method, the rectangular cross-section member is, for example, an automobile bumper stay (a type of the energy absorbing member).

According to the electromagnetic molding method, the metal tubular material may be expanded by electromagnetic molding, and the bumper stay having the rectangular cross section may be molded, and joined to the bumper reinforce at the same time. In this case, the bumper reinforce has a hole penetrating in the forward and rearward direction, part of the metal tubular material is inserted into the hole, and a place of the metal tubular material, which protrudes rearward from the hole, is surrounded with the die to perform electromagnetic molding. For the bumper stay, the collision face side is the forward direction, and the vehicle body side (side member side) is the rearward direction.

The metal tubular material has desirably, a substantially uniform cross section in the longitudinal direction, and may be an extruded material or a plate member molded into a tube. Examples of the metal tubular material include an aluminum alloy.

A electromagnetic molding method for polygon cross-section member according to the present invention is an improvement of an electromagnetic molding method for polygon cross-section member, the method including: disposing an aluminum alloy material having a tubular circumferential wall in a die having an inner circumferential face with a polygon cross section; disposing an electromagnetic molding coil in the aluminum alloy material; and passing a current through the electromagnetic molding coil in this state to expand the aluminum alloy material into a cross-sectional shape along the inner circumferential face of the die, and is particularly characterized by the cross-sectional shape of the aluminum alloy material and arrangement of the aluminum alloy material in the die. Specifically, the cross section of the circumferential wall of the aluminum alloy material includes a plurality of arc-like regions along the circumferential direction of a substantially circular basic cross section and a plurality of irregular regions sandwiched between the arc-like regions, the circumferential wall in the irregular regions protrudes inward or/and outward from the basic cross section, and the circumferential length of the circumferential wall in each irregular region is formed to be longer as compared to the case where the region is shaped like an arc along the circumferential direction of the basic cross section. The irregular regions are opposed to respective corners of the die. The substantially circular basic cross section used herein means a virtual cross section acquired by connecting the arc-like regions.

According to the electromagnetic molding method, the electromagnetic molding coil is desirably, a circular cross-section coil with a helically wound conductor.

According to the electromagnetic molding method, the aluminum alloy material may be expanded, and one or both ends of the aluminum alloy material may be expanded outward to form a flange.

According to the electromagnetic molding method, the polygon cross-section member is, for example, an energy absorbing member that is crushed and deformed when receiving a compressive load in the axial direction to absorb energy. In this case, the aluminum alloy material may be expanded, and a plurality of inwardly-recessed crash beads (portions having a smaller expansion amount become recesses) may be formed at the same time. This energy absorbing member is suitable for use in automobiles.

According to the electromagnetic molding method, the polygon cross-section member is, for example, an automobile bumper stay (a type of the energy absorbing member).

According to the electromagnetic molding method, the aluminum alloy material may be expanded by electromagnetic molding to mold the bumper stay having the polygon cross section, and the bumper stay may be joined to the bumper reinforce at the same time. In this case, a bumper reinforce has a hole penetrating in the forward and rearward direction, part of the aluminum alloy material is inserted into the hole, and a place of the aluminum alloy material, which protrudes rearward from the hole, is surrounded with the die to perform electromagnetic molding. For the bumper stay, the collision face side is the forward direction, and the vehicle body side (side member side) is the rearward direction.

The aluminum alloy material has desirably, a substantially uniform cross section in the longitudinal direction, and may be an extruded material or a plate member molded into a tube.

Effect of the Invention

In the energy absorbing member according to the present invention, the circumferential length of the tubular circumferential wall of the metal molding material is formed to be larger than that of the circumferential wall of the common circular cross section. According to the present invention, this is described as that the circumferential wall has an excessive line length. In the metal molding material according to the present invention, since the circumferential wall has the excessive line length, in expanding the end of the circumferential wall to mold the flange, even when the flange is molded at the same tube expansion rate (circumferential length after tube expansion/original circumferential length) as the metal molding material having the conventional circular cross section, the flange having a large diameter, that is, the flange having a large width can be formed. This enables fastening to a mating member that cannot be conventionally fastened with bolts, and increases the degree of freedom in setting bolt fastening locations.

Further, since the circumferential wall of the axial part of the energy absorbing member undulates in a waveform pattern in the circumferential direction, when viewed in the axial direction, a plurality of ridges parallel to the circumferential wall of the axial part in the axial direction are formed, which suppresses buckling deformation at collision, thereby increasing the average load and energy absorbing amount.

In the aluminum alloy polygon cross-section member according to the present invention, the circumferential length of the circumferential wall of the irregular region is set to be longer as compared to the case where the region is shaped like a mere arc cross section. According to the present invention, this means that the circumferential wall of the irregular regions has the excessive line length. In the aluminum alloy material according to the present invention, since the circumferential wall of the irregular regions has the excessive line length, and the irregular regions are disposed as opposed to the respective corners of the inner circumferential face of the die. Therefore, when the aluminum alloy material is expanded by electromagnetic molding, the circumferential wall of the irregular regions easily enters further toward the inner circumferential faces of the corners of the die by the excessive line length to mold the polygon cross-section member having small R of each corner and clear ridges along the inner circumferential faces of the corners of the die.

Since the irregular regions of the aluminum alloy material has the excessive line length, a change (extension of the material) of the circumferential length of the aluminum alloy material is reduced by the excessive line length, thereby suppressing a local decrease in the thickness particularly at corners of the polygon cross-section member, and preventing breakage.

Further, since the circumferential wall of the aluminum alloy material is formed of the plurality of arc-like regions along the circumferential direction of the basic cross section except for the irregular regions, the gap between the aluminum alloy material and the electromagnetic molding coil in the circumferential direction is small as conventional, exerting a sufficiently large electromagnetic molding force to the aluminum alloy material.

By applying the method for producing the polygon cross-section member according to the present invention to molding of the energy absorbing member crushed in the axial direction to absorb energy, a decrease in the thickness of the corners (ridges) that largely contribute to the energy absorbing amount at crushing and deformation can be suppressed, realizing a light-weighted energy absorbing member having a good energy absorbing property. Further, by applying the method to molding of the bumper stay that is the energy absorbing member, the cross-sectional shape of the bumper stay can coincide with the cross-sectional shape of the side member having commonly a polygon cross section. Thereby, the load exerted onto the bumper stay at collision can be transmitted from the entire circumferential wall of the bumper stay to the entire circumferential wall of the side member to stabilize the deformation mode of the bumper stay at collision and suppress a load change due to deformation, ensuring a predetermined energy absorbing performance.

BRIEF DESCRIPTION OF THE DRAWINGS

FIG. 18 is a view showing the cross-sectional shape of the metal tubular material and other analysis conditions that are used for analysis of the magnetic pressure in the graph of FIG. 16;

MODE FOR CARRYING OUT THE INVENTION

An energy absorbing member according to the present invention will be specifically described below using mainly a bumper stay as an example with reference to FIGS. 1 to 15. The description of the bumper stay is also applied to other energy absorbing members.

First, with reference to FIG. 14, a conventional metal molding material (stay material) and the energy absorbing member (bumper stay) will be described.

Figure 14A:
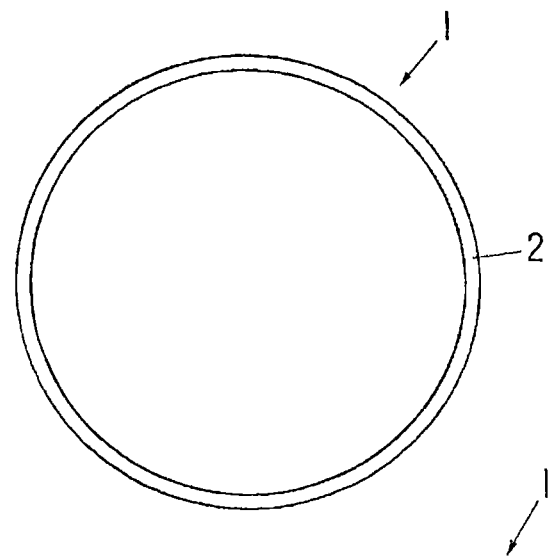
FIGS. 14(a) and 14(b) are a plan view and a side view of a conventional bumper stay material, respectively.
Figure 14B:
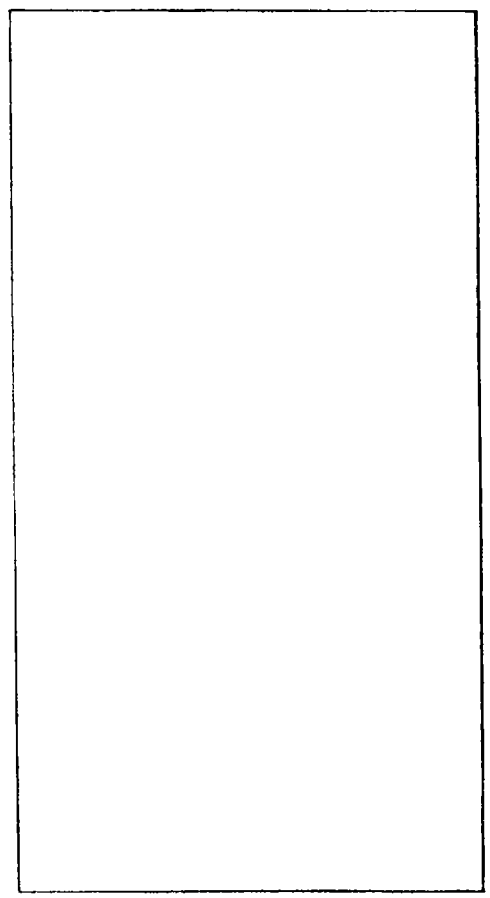

FIGS. 14(a) and 14(b) each show a stay material 1 acquired by cutting a metal molding material (aluminum alloy extruded material) by a predetermined length. The stay material 1 is a cylindrical body having a circular cross section, and in this example, both end faces (cut faces) are located within a plane vertical to the axial direction. The stay material 1 acquired by press-molding or roll-molding a metal plate into a tubular shape may be used.

Figure 15A:
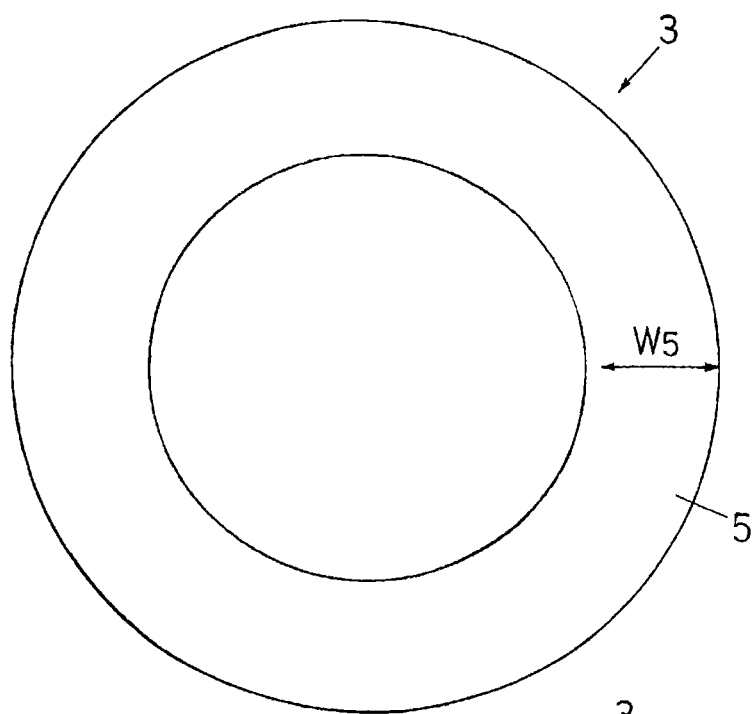
FIGS. 15(a) and 15(b) are a plan view and a side view of a conventional bumper stay, respectively.
Figure 15B:
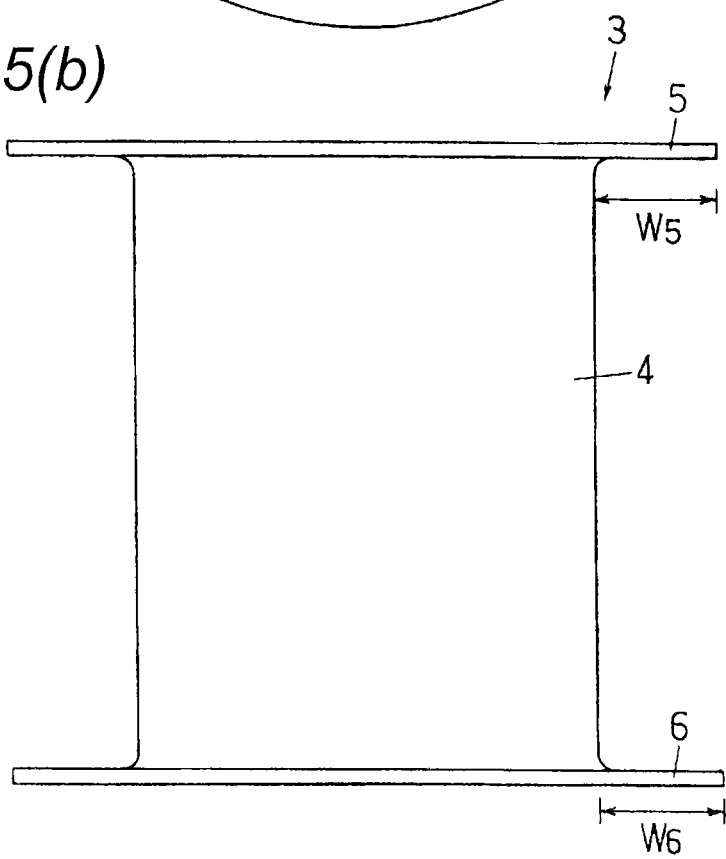

For example, as described in JP 2005-7475 A and JP 2004-189062 A, a circumferential wall 2 of the stay material 1 except its both ends is surrounded with a die, an electromagnetic molding coil is inserted into the stay material 1, and a large current is instantaneously passed through the electromagnetic molding coil, thereby expanding the circumferential wall of the ends of the stay material 1 by electromagnetic molding to mold a bumper stay 3 shown in FIGS. 15(a) and 15(b). The bumper stay 3 includes a cylindrical axial part 4 and flanges 5 and 6 formed at both ends of the axial part. The flanges 5 and 6 are formed in a plane vertical to the axial direction of the axial part 4. In this example, the tube expansion rate (circumferential length after tube expansion/original circumferential length) of the axial part 4 is set to be zero or extremely small. As described above, dimensions W5 and W6 of the flange widths of the flanges 5 and 6 are limited.

The flanges 5 and 6 can be formed by only one electromagnetic molding, and as described in Patent Document 5, can be also formed by repeating electromagnetic molding twice or more, or performing press-molding before and after electromagnetic molding as appropriate.

Figure 1A:
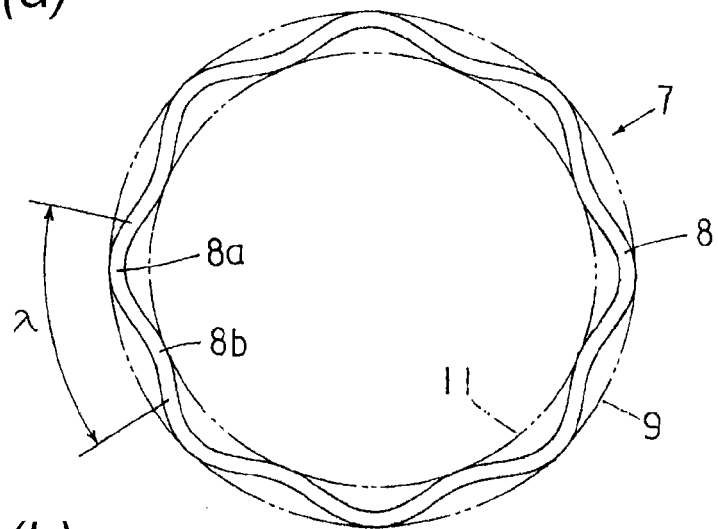
FIGS. 1(a) and 1(b) are a plan view and a side view of a bumper stay material according to the present invention, respectively.
Figure 1B:
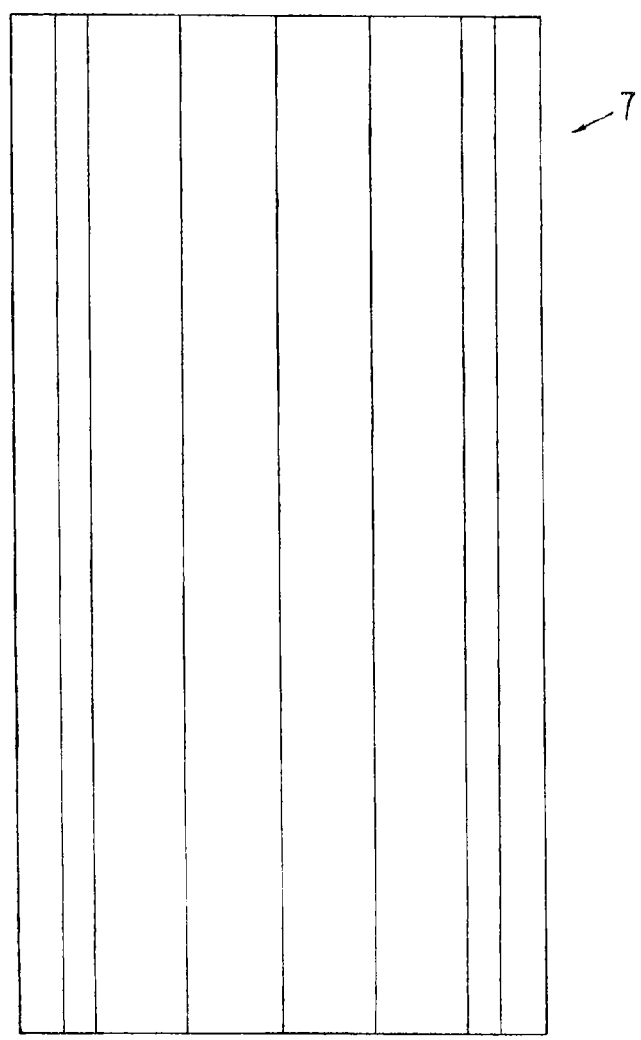

FIGS. 1(a) and 1(b) show a stay material 7 according to the present invention. The stay material 7 is formed by cutting a metal molding material (aluminum alloy extruded material) having a tubular circumferential wall on which irregularities are repeated in the circumferential direction by a predetermined length.

As shown in FIG. 1(a), a circumferential wall 8 of the stay material 7 undulates in a waveform pattern in the circumferential direction. This waveform is sinusoidal waveform having a wavelength λ, a unit waveform constituted of a projection 8a and a depression 8b is repeated along the circumferential direction of the circumferential wall 8 eight times, and the circumferential wall 8 becomes symmetrical eight times in a cross section vertical to the axial direction. The thickness of the circumferential wall 8 is uniform on the entire circumference, and a minimum circumscribed circle 9 that contacts the outer circumferential face (top of the projections 8a) of the circumferential wall 8 and a maximum circumscribed circle 11 that contacts the inner circumferential face (bottom of the depressions 8b) of the circumferential wall 8 are concentric. Given that the circumferential length (length of one round along the undulation in the waveform pattern) of the outer periphery of the circumferential wall 8 is L, and the circumferential length of the minimum circumscribed circle 9 is $L_0$, the relation of "$L>L_0$" is established. L is Larger than $L_0$.

In the stay material 7, like the conventional stay material 1, both end faces (cut faces) are located in the plane vertical to the axial direction. The stay material 7 acquired by molding a metal plate into a tubular body by press-molding or roll-molding (metal molding material) can be used.

Figure 2A:
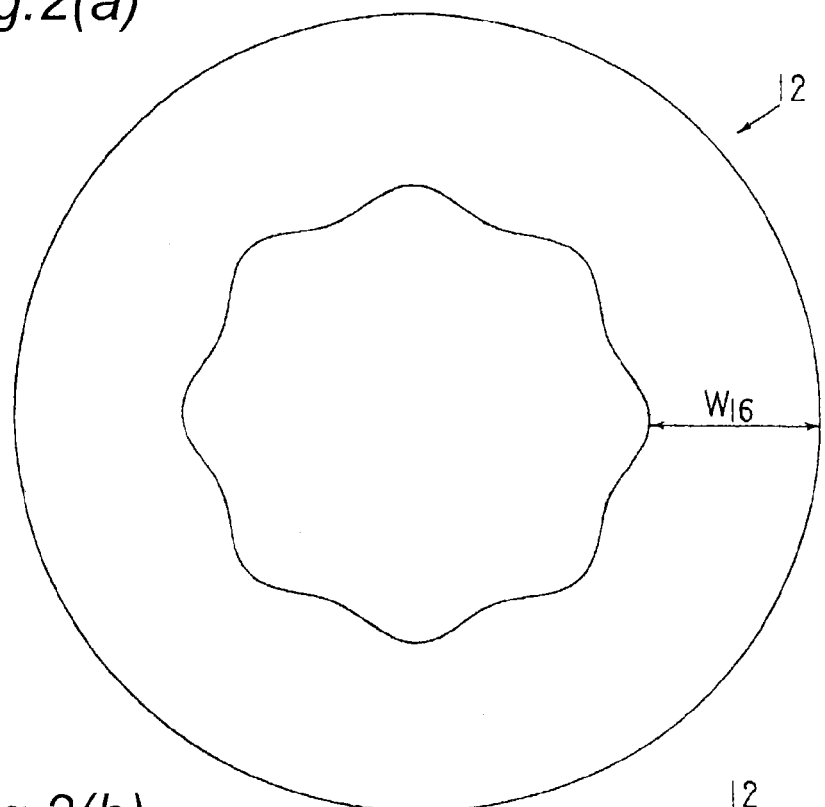
FIGS. 2(a) and 2(b) are a plan view and a side view of a bumper stay according to the present invention, respectively.
Figure 2B:
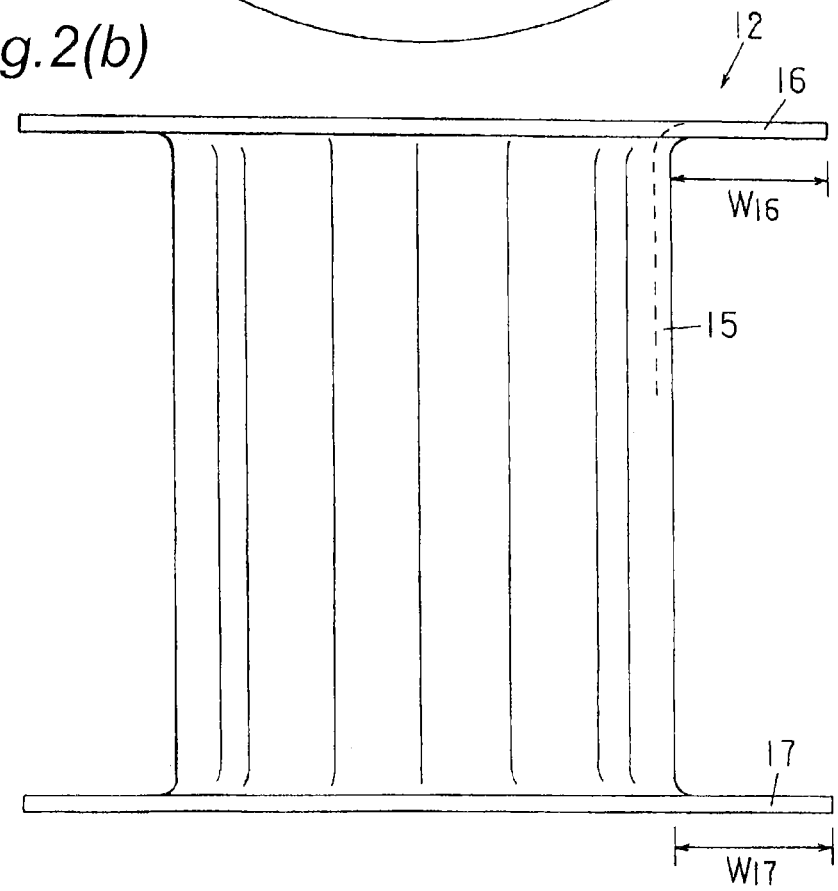
Figure 3:
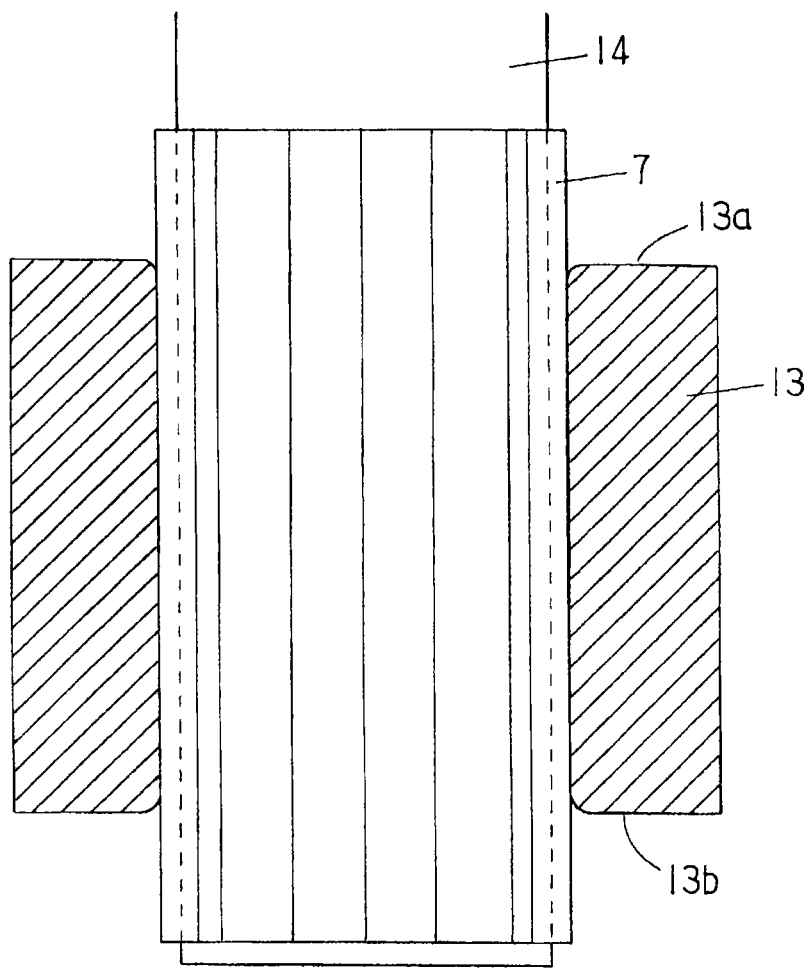
FIG. 3 is a partial sectional side view for describing a method for producing the bumper stay in FIG. 2.

In a bumper stay 12 shown in FIGS. 2(a) and 2(b), like the bumper stay 3, the circumferential wall 8 of the stay material 7 except for its both ends is surrounded with a die, an electromagnetic molding coil wound into a tubular shape is inserted into the stay material 7, and a large current is instantaneously passed through the electromagnetic molding coil to expand the ends of the stay material 7. The inner circumferential face of the die is tubular, undulates in a waveform (sinusoidal waveform) pattern in the circumferential direction, and is in substantially close contact with the outer circumferential face of the circumferential wall 8 of the stay material 7. FIG. 3 shows arrangement of the stay material 7, a die 13, and an electromagnetic molding coil 14. The stay material 7 is expanded by electromagnetic molding, so that a middle portion of the stay material 7 is in press-contact with the inner circumferential face of the die 13, and both ends protruding from end faces 13a and 13b of the die 13 are expanded to hit against the faces 13a and 13b.

The electromagnetically-molded bumper stay 12 is constituted of a tubular axial part 15 undulating in a waveform (sinusoidal waveform) pattern in the circumferential direction, and flanges 16 and 17 formed at both ends of the axial part. The flanges 16 and 17 are formed in a plane vertical to the axial direction of the axial part 15. In this example, the tube expansion rate of the axial part 15 is set to be zero or extremely small, and the circumferential wall of the axial part 15 substantially takes the cross-sectional shape of the circumferential wall 8 of the original stay material 7.

The circumferential wall 8 of the stay material 7 undulates in a waveform pattern in the circumferential direction, and between the circumferential length L of the outer periphery of the circumferential wall 8 and the circumferential length $L_0$ of the minimum circumscribed circle 9, the relation of "$L>L_0$" is established. According to the present invention, $L-L_0$ is referred to the excessive line length. Given that the outer diameter of the stay material 1 having the conventional circular cross section is the same as the diameter of the minimum circumscribed circle 9 (the outer diameter of the stay material 7), the circumferential wall 8 of the stay material 7 can be said to have the excessive line length of $L-L_0$ with respect to the circumferential wall 2 of the stay material 1.

Since the stay material 7 has the excessive line length, when the flanges 16 and 17 are molded at the same tube expansion rate (circumferential length after tube expansion/original circumferential length) as the tube expansion rate of the stay material 1, the circumferential length after tube expansion (the outer diameters of the flanges 16 and 17), and in turn, flange widths $W_{16}$ and $W_{17}$ (the smallest flange width is shown in FIG. 2) can be increased. Even when the stay material 7 having the circumferential wall 8 undulating in a waveform pattern in the circumferential direction is used, the outer periphery (contour) of the flanges 16 and 17 becomes substantially circular as shown in FIG. 2(a).

The flanges of the bumper stay can be formed by performing electromagnetic molding once, or by performing electromagnetic molding plural times as described in JP 2006-305587 A. Alternatively, the same flanges can be formed by repeating press-molding plural times (refer to the conventional art in JP 2006-305587 A) or performing partial forging, in place of electromagnetic molding.

Figure 4B:
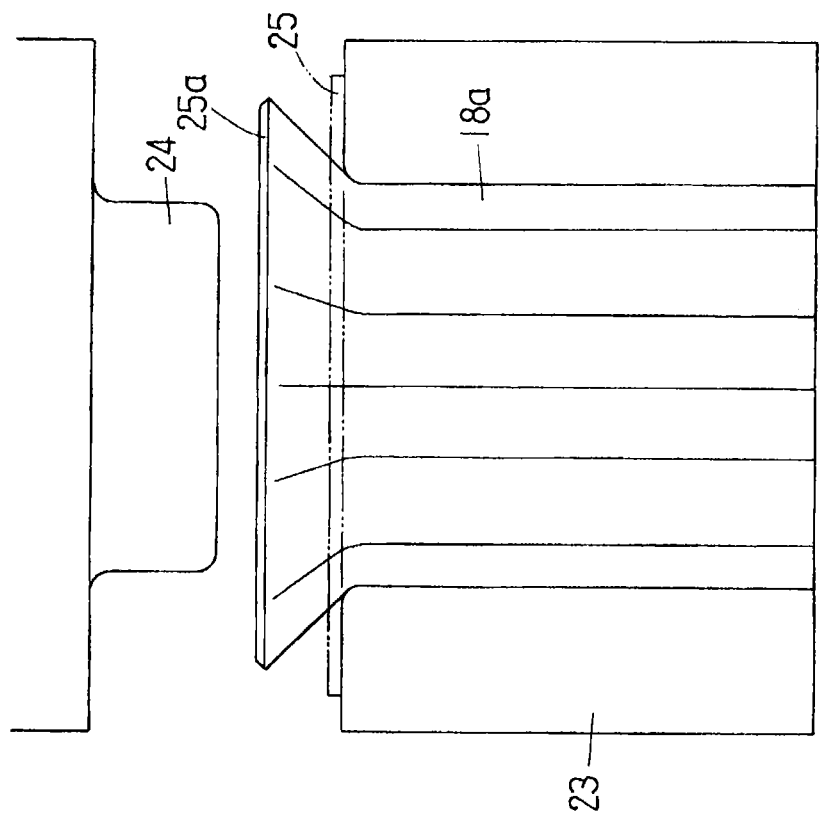
FIG. 4 are views for describing the method for producing the bumper stay according to the present invention in the order of steps.
Figure 4A:
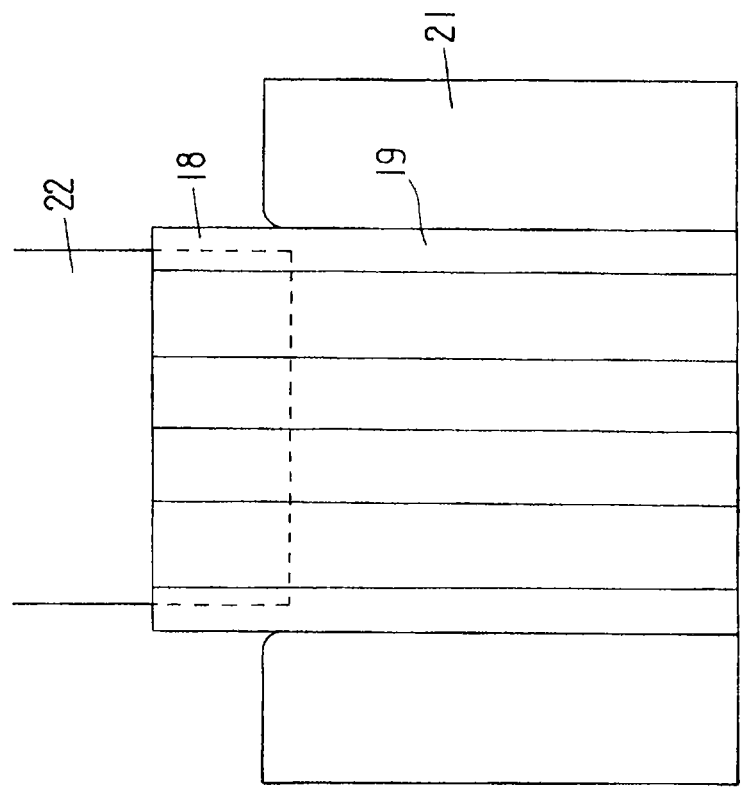

Alternatively, the flanges can be formed by combination of electromagnetic molding and press-molding. This will be described with reference to FIGS. 4(a) and 4(b). First, in a first step, as shown in FIG. 4(a), a circumferential wall 19 of a stay material 18 (having the same cross-sectional shape as the stay material 7) is surrounded with a die 21, an electromagnetic molding coil 22 having a circular cross section (helically wound with uniform diameter) is inserted into the stay material 18, and a large current is instantaneously passed through the electromagnetic molding coil 22, thereby expanding an end of the stay material 18, which protrudes from an end face of the die 21, in a flared fashion to mold a stay intermediate member 18a. Subsequently, in a second step, as shown in FIG. 4(b), the stay intermediate member 18a is held by a die 23, and a flared part 25a is press-molded and expanded in the axial direction with a punch 24 to form a flange 25.

Conversely, the end of the stay material may be press-molded in a flared fashion in a first step and then, the flared part may be further expanded by electromagnetic molding to form a flange (see JP 2006-305587 A).

Figure 5:
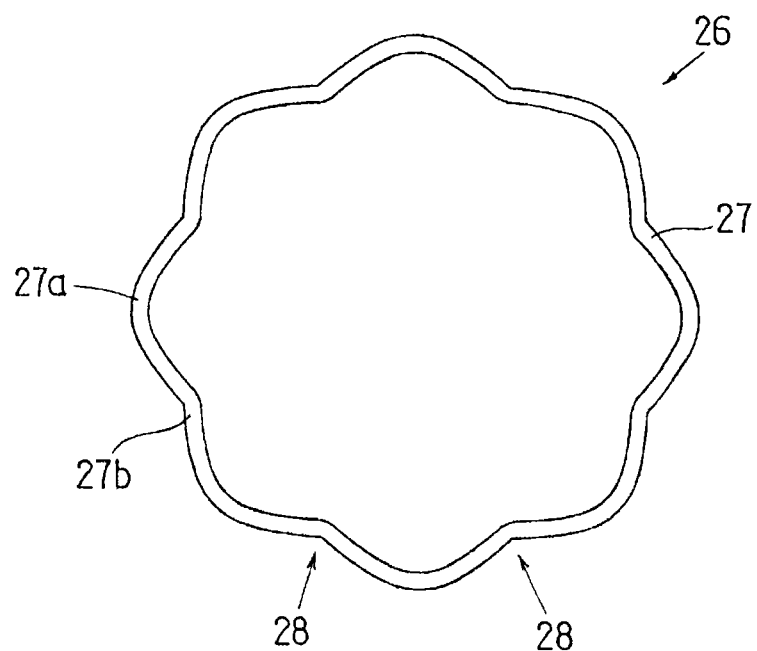
FIG. 5 is a sectional view of an axial part of the bumper stay according to the present invention.
Figure 6A:
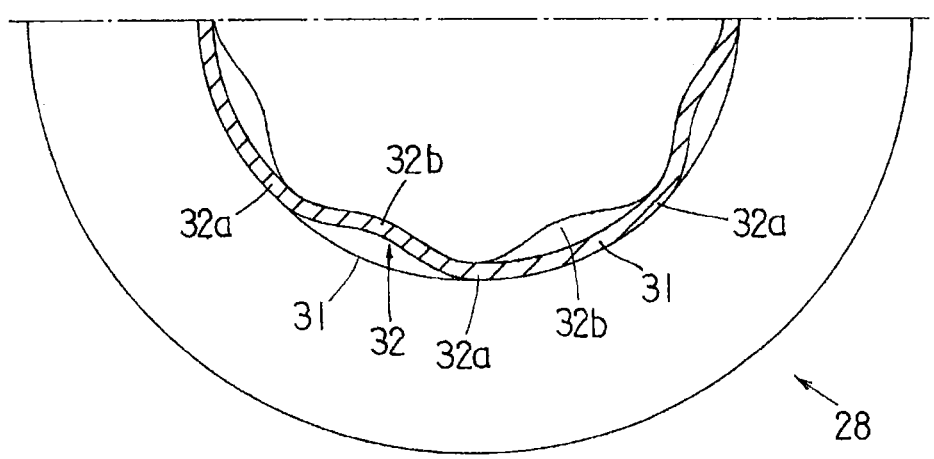
FIGS. 6(a) and 6(b) are a sectional plan view (sectional view taken along A-A in 6(b)) and a side view of the bumper stay with crash beads according to the present invention, respectively.
Figure 6B:
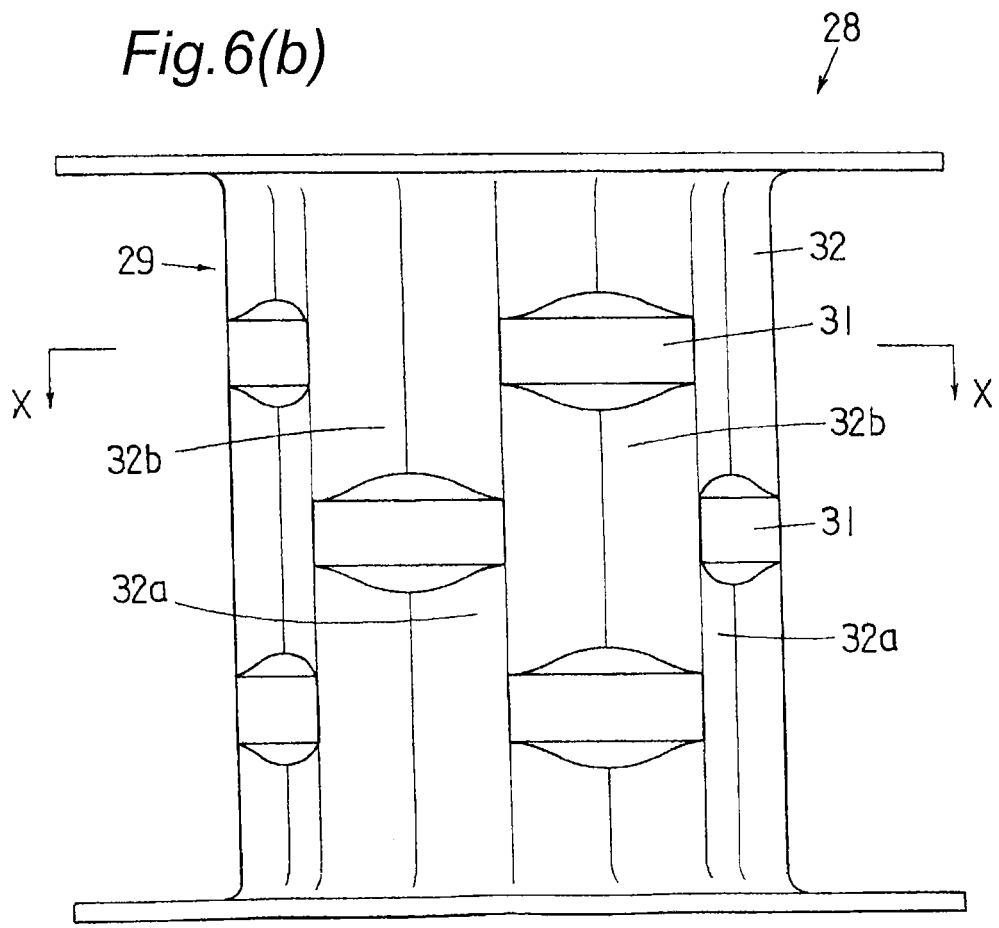

In the bumper stay 12 shown in FIG. 2, the tube expansion rate of the axial part 15 is zero or extremely small and thus, the axial part 15 takes the substantially same cross-sectional shape of the original stay material 7. However, the tube expansion rate of the axial part of the bumper stay can be set to a predetermined value or/and, the cross-sectional shape of the axial part can be substantially changed from the cross-sectional shape of the original stay material 7. For example, an axial part 26 shown in FIG. 5 is formed by electromagnetically molding the same stay material 7 such that the waveform of the circumferential wall 27 is triangular waveform at depressions 27b (sinusoidal waveform at projections 27a). A ridge 28 in parallel to the circumferential wall 27 of the axial part 26 in the axial direction becomes more distinct than the example in FIG. 2 (axial part 15).

In the above-mentioned example, the waveform of the circumferential wall of the stay material (and the circumferential wall of the axial part of the bumper stay) includes eight unit waveforms, and in consideration of deformation of the axial part at collision, the number of unit waveforms constituting the waveform of the circumferential wall is desirably en even number. However, an odd number is also applicable.

In expanding and forming the flange by electromagnetic molding, crash beads can be simultaneously molded at the axial part of the bumper stay. For example, in the case of electromagnetic molding shown in FIG. 3, the crash beads can be molded by forming recesses of predetermined shape at plural locations on the inner circumferential face of the die 13 surrounding the stay material 7 and expanding the circumferential wall 8 of the stay material 7 into the recesses at electromagnetic molding. In a bumper stay 28 shown in FIG. 6, crash beads 31 formed in an axial part 29 are formed as described above.

The eight rows of crash beads 31 are formed in depressions 32b of the waveform of a circumferential wall 32 in the axial direction of the axial part 29 to fill the depressions 32b and extend to adjacent projections 32a, 32a. In other words, one row of crash beads are formed in the axial direction for each unit waveform constituting the waveform of the circumferential wall 32, and the crash beads 31, 31, . . . in adjacent rows of crash beads have different heights, that is, are arranged in a staggered pattern in the axial direction, and the crash beads 31, 31, . . . in every other rows have the same height. The crash beads are not necessarily formed in the depressions of the waveform of the circumferential wall.

The stay material can take various cross-sectional shapes other than the above-mentioned shapes. For example, the thickness of the circumferential wall can be changed in the circumferential direction.

(1) Locations away from the center of the circumferential wall, which are less prone to receive the molding force of the electromagnetic molding coil (projections of the waveform) are made thinner. Even when the molding force of the electromagnetic molding coil is not sufficient, the flange can be molded.

(2) Locations becoming bolt fastening positions after molding of the flange (planned bolt fastening locations) are made thicker to increase the strength of bolt fastening parts.

(3) When the crash beads are expanded and molded on the circumferential wall of the axial part of the bumper stay, locations where the crash beads are molded on the circumferential wall of the stay material (depressions of the waveform) are made thinner to be easily expanded by electromagnetic molding, and the projections of the waveform are made thicker to prevent a decrease in the energy absorbing amount of the axial part of the bumper stay.

Figure 7:
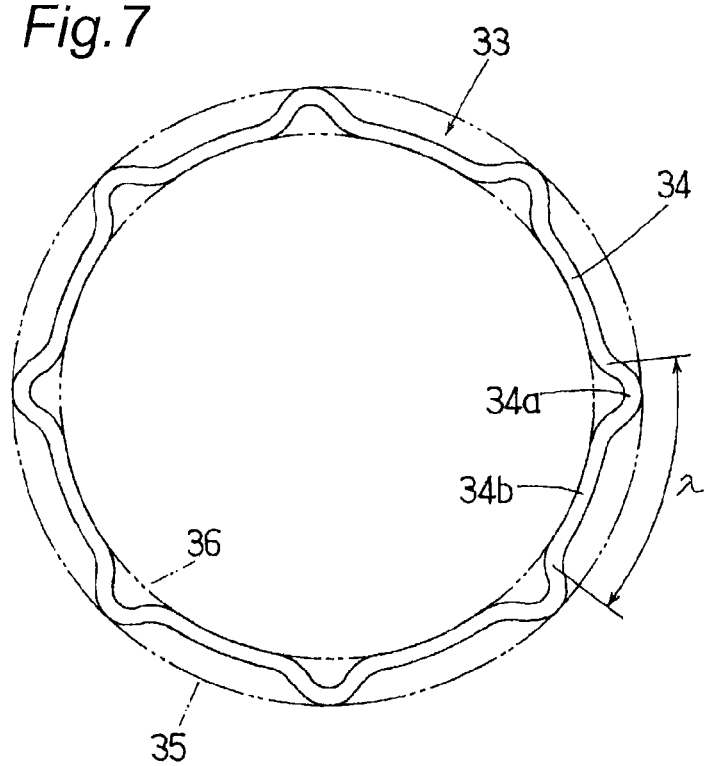
FIG. 7 is a plan view of a bumper stay material according to the present invention.
Figure 8:
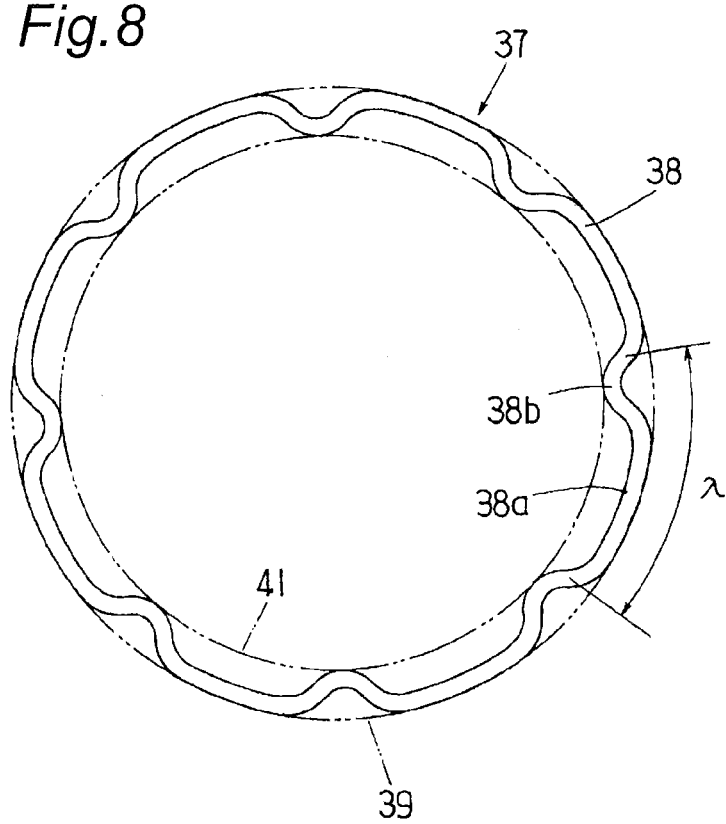
FIG. 8 is a plan view of a bumper stay material according to the present invention.
Figure 9:
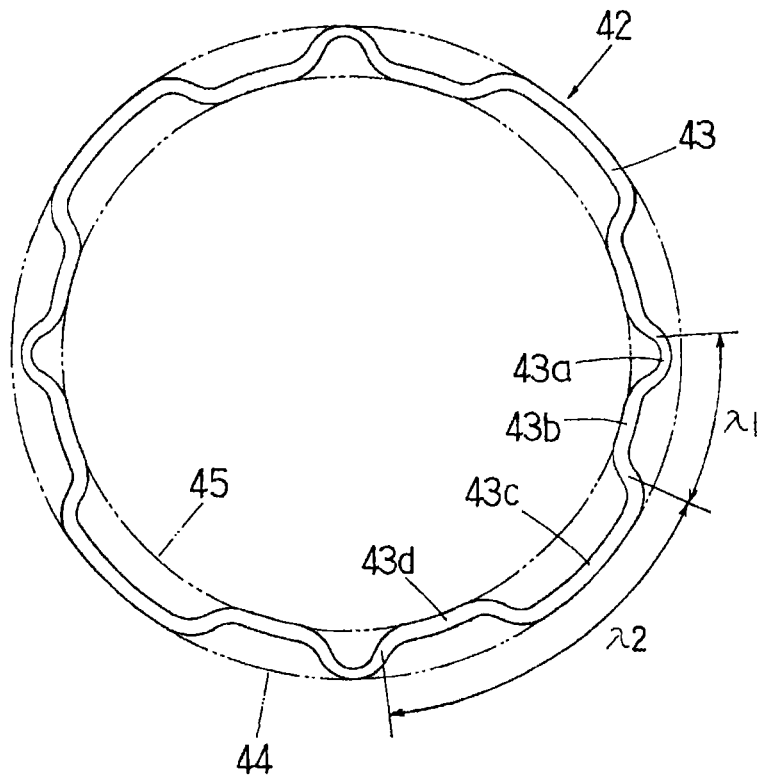
FIG. 9 is a plan view of a bumper stay material according to the present invention.

FIGS. 7 to 9 show other examples of the cross-sectional shape of the stay material. The waveform of the circumferential wall is different from that of the stay material 7.

A stay material 33 in FIG. 7 has a circumferential wall 34 undulating in a waveform pattern in the circumferential direction. The waveform is gear-like, unit waveform having a wavelength λ, which includes a projection 34a and a depression 34b, is repeated along the circumferential direction of the circumferential wall 34 eight times, and the circumferential wall 34 becomes symmetrical in the cross section vertical to the axial direction eight times. The depression 34b occupies most of the wavelength λ of the unit waveform. The thickness of the circumferential wall 34 is uniform over the entire circumference, a minimum circumscribed circle 35 that contacts the outer circumferential face of the circumferential wall 34 and a maximum circumscribed circle 36 that contacts the inner circumferential face of the circumferential wall 34 are concentric.

In the stay material 33, given that the circumferential length (length of one round along the undulation in the waveform pattern) of the outer periphery of the circumferential wall 34 is L and the circumferential length of the minimum circumscribed circle 35 is $L_0$, the relation of "$L>L_0$" is established, and the circumferential wall 34 has the above-mentioned excessive line length.

The depressions 34b of the circumferential wall 34 are in contact with the substantially entire circumference of the maximum circumscribed circle 36 along the circumferential direction. Accordingly, the contact line length of the stay material 33 with the circumferential wall 34 and the maximum circumscribed circle 36 is larger than that of the stay material 7.

Since the electromagnetic molding coil for tube expansion is commonly a coil helically wound into a cylindrical or truncated cone shape, the circumferential wall 34 can be brought into close contact with the electromagnetic molding coil in most of the circumferential direction of the stay material 33 and therefore, in molding the flange, a high molding force (repulsion force) of the electromagnetic molding coil can be applied to the circumferential wall 34 of the stay material 33.

A stay material 37 shown in FIG. 8 has a circumferential wall 38 undulating in a waveform pattern in the circumferential direction. The waveform is gear-like, a unit waveform having a wavelength λ, which includes a projection 38a and a depression 38b, is repeated along the circumferential direction of the circumferential wall 38 eight times, and the circumferential wall 38 becomes symmetrical eight times. The thickness of the circumferential wall 38 is uniform over the entire circumference, and a minimum circumscribed circle 39 that contacts the outer circumferential face of the circumferential wall 38 and a maximum circumscribed circle 41 that contacts the inner circumferential face of the circumferential wall 38 are concentric.

In the stay material 37, given that the circumferential length (length of one round along the undulation in the waveform pattern) of the outer periphery of the circumferential wall 38 is L and the circumferential length of the minimum circumscribed circle 39 is $L_0$, the relation of "$L>L_0$" is established, and the circumferential wall 38 has the above-mentioned excessive line length.

The stay material 37 is similar to the stay material 33 in that the circumferential wall 38 has the gear-like waveform, while the stay material 37 is different from the stay material 33 in that the length of the projection 38a of the waveform in the circumferential direction is larger than the length of the depression 38b in the circumferential direction. Desirably, the locations of the projections 38a are bolt fastening locations after molding of the flange (expected bolt fastening locations).

A stay material 42 shown in FIG. 9 has a circumferential wall 43 undulating in a waveform pattern in the circumferential direction. The waveform is a combination of two different waveforms (as in the waveform of the circumferential wall 34 of the stay material 33 and the waveform of the circumferential wall 38 of the stay material 37). A unit waveform having a wavelength $\lambda_1$, which includes a projection 43a and a depression 43b, and a unit waveform having a wavelength $\lambda_2$, which includes a projection 43c and a depression 43d, are alternately repeated along the circumferential direction of the circumferential wall 43 four times, and the circumferential wall 43 becomes symmetrical in the cross section vertical to the axial direction four times. However, the projections 43a are classified into the projections that are thin on the side of the outer periphery and does not contact a minimum circumscribed circle 44, and the projections that are thin on the side of the inner periphery and contacts the minimum circumscribed circle 44, and precisely speaking, there are two types of unit waveform having the wavelength $\lambda_1$. The minimum circumscribed circle 44 that contacts the outer circumferential face of the circumferential wall 43 and a maximum circumscribed circle 45 that contacts the inner circumferential face of the circumferential wall 43 are concentric.

In the stay material 42, given that the circumferential length (length of one round along the undulation in the waveform pattern) of the outer periphery of the circumferential wall 43 is L and the circumferential length of the minimum circumscribed circle 44 is $L_0$, the relation of "$L > L_0$" is established, and the circumferential wall 43 has the above-mentioned excessive line length.

The circumferential wall 43 has wavelength, height, and thickness of the waveform that vary in the circumferential direction. For the thickness of the circumferential wall 43, the projections 43a are thinner and are easily deformed by electromagnetic molding. The projections 43c are longer in the circumferential direction and thicker than the projections 43a. Desirably, the locations of the projection 43c are bolt fastening locations after molding of the flange.

In the case of molding the bumper stay with flange using the stay materials 33, 37, 42, as in the stay material 7, the tube expansion rate of the axial part of the bumper stay may be set to be zero or extremely small such that the cross-sectional shape of the axial part can be substantially same as the original cross-sectional shape of original stay material. Further, as in the stay material 7, the tube expansion rate of the axial part of the bumper stay can be set to a predetermined value or/and, the cross-sectional shape of the axial part can be substantially changed from the original cross-sectional shape of the stay materials 33, 37, 42.

When electromagnetic molding is adopted to mold the flange, the stay material has desirably following quality and shape.

The stay material is desirably made of a JIS6000-aluminum alloy that is highly heat-conductive and can be strengthened by heat treatment.

The number N of unit waveforms (combination of one projection and one depression) constituting the waveform of the circumferential wall of the stay material is preferably, 3 or more and 30 or less, and more preferably, an even number. When N is larger than 30, the curvature of the waveform largely changes, possibly generating cracks during molding of the flange, and when N is smaller than 3, the excessive line length is hardly ensured.

The inner diameter $d_1$ (the diameter of the maximum circumscribed circle) of the stay material is preferably 20 mm or more and 200 mm or less. When $d_1$ is larger than 200 mm, a sufficient flange width can be ensured without irregularities on the circumferential wall, and when $d_1$ is smaller than 20 mm, it is difficult to expand and mold the flange by electromagnetic molding.

The amplitude (difference between the outer diameter of the stay material (the diameter of the minimum circumscribed circle) $d_2$ and the inner diameter (the diameter of the maximum circumscribed circle) $d_1$) $d_2 - d_1$ of the waveform of the circumferential wall of the stay material is preferably, 2 mm or more and 40 mm or less. When $d_2 - d_1$ is larger than 40 mm, it is difficult to act electromagnetic force necessary for tube expansion, and when $d_2 - d_1$ is smaller than 2 mm, an effective excessive line length can be hardly ensured.

The bumper stay according to the present invention can be applied to both of a type fastened to the bumper reinforce with bolt and nut, and a type joined to the bumper reinforce by electromagnetic molding.

Figure 10:
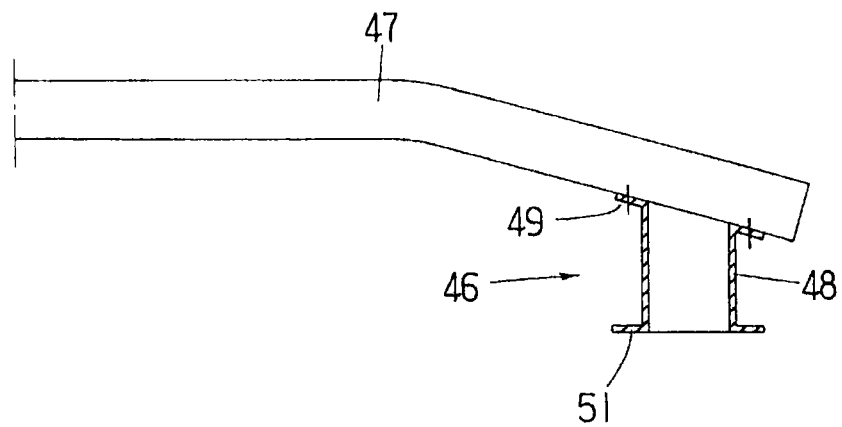
FIG. 10 is a partial sectional plan view of a bumper structure including a bumper stay and a bumper reinforce according to the present invention.

FIG. 10 shows a bumper structure including a bumper stay 46 and a bumper reinforce 47. The bumper stay 46 includes a tubular axial part 48 having a circumferential wall undulating in a waveform pattern in the circumferential direction and flanges 49 and 51 formed at both ends of the axial part 48. The flange 49 inclined relative to the axial direction of the axial part 46 is fastened to the back face of the bumper reinforce 47 with bolt and nut. The flange 51 on the side of the side member (vehicle body) is formed vertical to the axial direction of the axial part 46, and is fastened to the front end of the side member (not shown) with bolt and nut.

The bumper reinforce 47 is formed of a hollow member made of steel or aluminum alloy, roll-form steel is preferably used in the case of steel, and a extruded material is preferably used in the case of aluminum alloy.

The bumper stay 46 is formed of a stay material made of an aluminum alloy extruded material or a stay material formed by molding an aluminum alloy plate into a tubular shape.

Figure 11A:
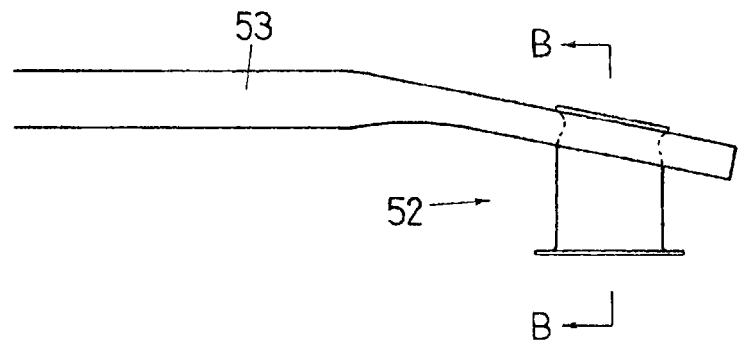
FIGS. 11(a), 11(b), and 11(c) are a plan view and a sectional view taken along B-B in 11(a) of a bumper structure including a bumper stay and a bumper reinforce, and a sectional view of a bumper stay intermediate member according to the present invention, respectively.
Figure 11B:
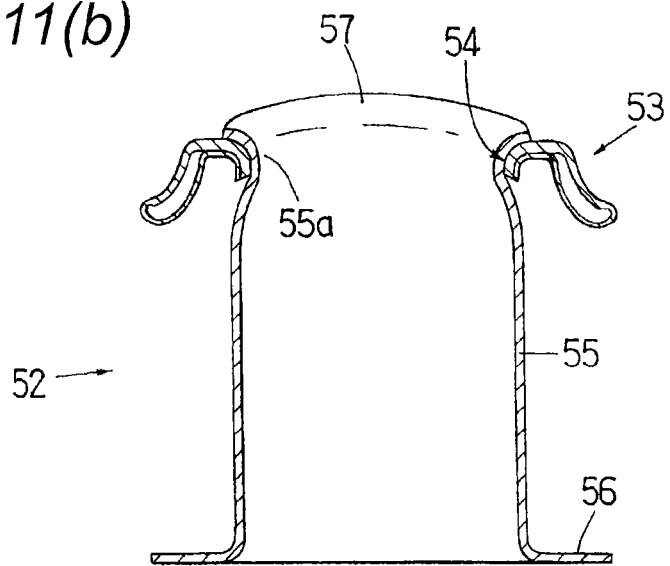

FIGS. 11(a) and 11(b) show a bumper structure including a bumper stay 52 and a bumper reinforce 53. The basic structure of the bumper structure is the same as the structure described in JP 2010-116129 A.

Like the bumper reinforce 47, the bumper reinforce 53 is formed of a hollow member made of steel or aluminum alloy, and its both ends are pressed in the forward and rearward direction so as to have an inverted C-like cross section. Front and back walls of the bumper reinforce 53 are in close contact with each other by this pressing, and a circular burring hole 54 is formed there. To prevent damage at collision, a flange of the burring hole 54 protrudes toward the side member (see FIG. 4 in JP 2010-116129 A).

The bumper stay 52 includes an axial part 55 having a tubular circumferential wall undulating in a waveform pattern in the circumferential direction and a flange 56 formed at the end on the side of the side member, and the front end (connection part 55a) of the axial part 55 is swaged to the bumper reinforce 53. The circumferential wall of the connection part 55a is close contact with the inner circumferential face of the burring hole 54, and the front end is extended to form a small flange 57.

Figure 11C:
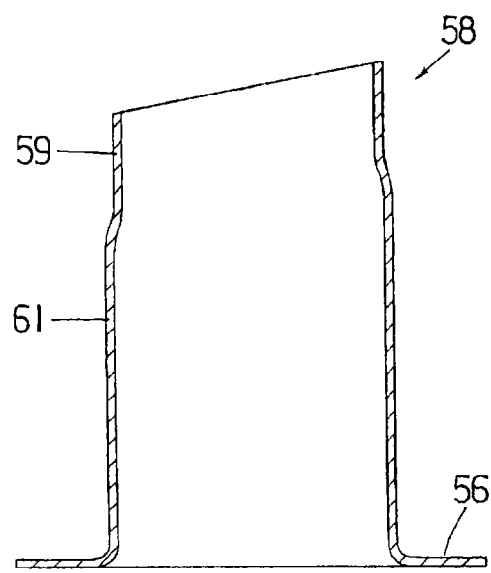
Figure 17:
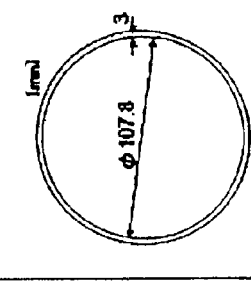
FIG. 17 is a view showing the cross-sectional shape of the metal tubular material and other analysis conditions that are used for analysis of the magnetic pressure in the graph of FIG. 16.
Figure 17:
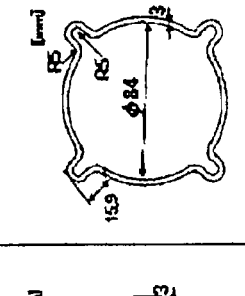
Figure 17:
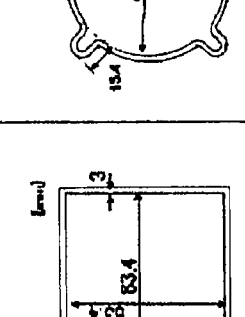
Figure 17:
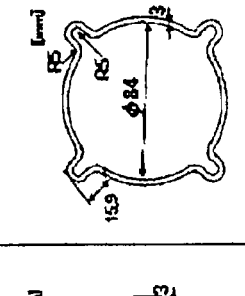
Figure 17:
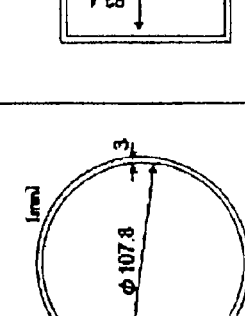

In the production of the bumper structure, first, as shown in FIG. 11(c), the tubular stay material is previously molded into a stay intermediate material 58 (see FIG. 17 in JP 2010-116129 A). The stay intermediate material 58 includes a small-diameter axial part 59 having the original circumferential wall of the stay material, a slightly expanded large-diameter axial part 61, and a flange 56 formed at the end on the side of the side member. The stay intermediate material 58 is molded by expanding the stay material (except for the small-diameter axial part 59) by electromagnetic molding.

Subsequently, the small-diameter axial part 59 of the stay intermediate material 58 is inserted into the burring hole 54, and is expanded by electromagnetic molding. This allows the stay intermediate material 58 (bumper stay 52 after electromagnetic molding) to be swaged to the bumper reinforce 53. The electromagnetic molding can locally heat and soften only the small-diameter axial part 59 (refer to JP 2010-69927 A).

By inserting a front portion of the stay material as it is into the burring hole 54 without being molded, and expanding the entire length of the stay material by electromagnetic molding, the axial part 55 and the flange 56 can be molded and the bumper reinforce 53 can be swaged at the same time (refer to JP 2010-116129 A).

Figure 12A:
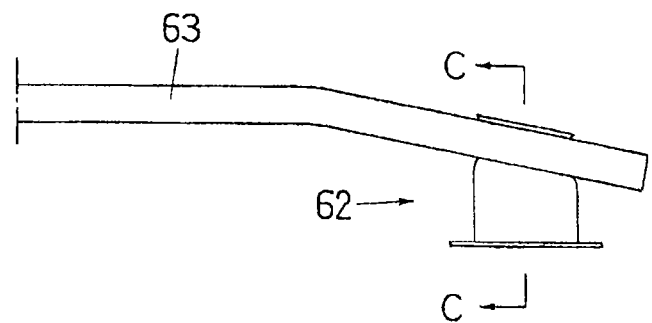
FIGS. 12(a) and 12(b) are a plan view and a sectional view taken along C-C in 12(a) of a bumper structure including a bumper stay and a bumper reinforce according to the present invention, respectively.
Figure 12B:
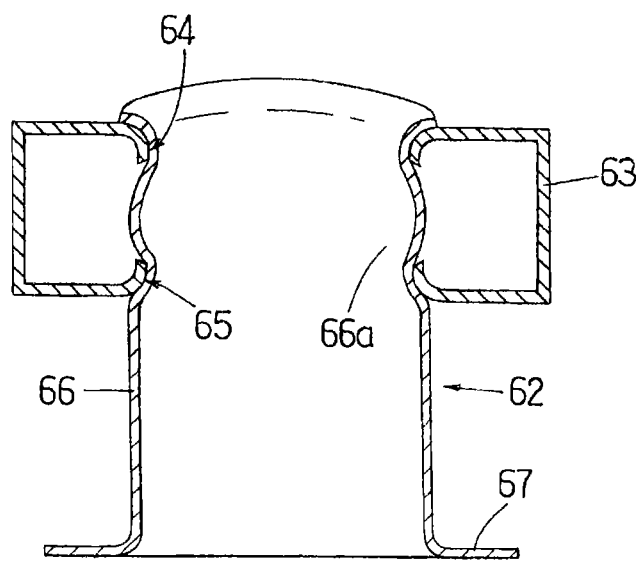

FIG. 12 shows a bumper structure including a bumper stay 62 and a bumper reinforce 63. The basic structure of the bumper structure is the same as the structure described in JP 2010-69927 A. Like the bumper reinforce 47, the bumper reinforce 63 is formed of a hollow member made of steel or aluminum alloy.

The bumper reinforce 63 is different from the bumper reinforce 53 shown in FIG. 11 in that the bumper reinforce 63 has the uniform cross-sectional shape over the entire length (both ends are not pressed), burring holes 64 and 65 are formed in front and back walls of the bumper reinforce 63, and flanges of both the burring holes 64 and 65 protrude toward space in the bumper reinforce 63.

The bumper stay 62 includes an axial part 66 having a tubular circumferential wall undulating in a waveform pattern in the circumferential direction and a flange 67 formed at the end on the side of the side member, and the front end (connection part 66a) of the axial part 66 is joined to the bumper reinforce 63. The bumper stay 62 is different from the bumper stay 52 shown in FIG. 11 in that the connection part 66a is in close contact with the inner circumferential faces of the two burring holes 64 and 65, and expands between the burring holes 64 and 65 (between front and back walls of the bumper reinforce 63).

The bumper structure including the bumper stay 62 and the bumper reinforce 63 can be produced as in the same way as the method of producing the bumper structure in FIG. 11.

Figure 13A:
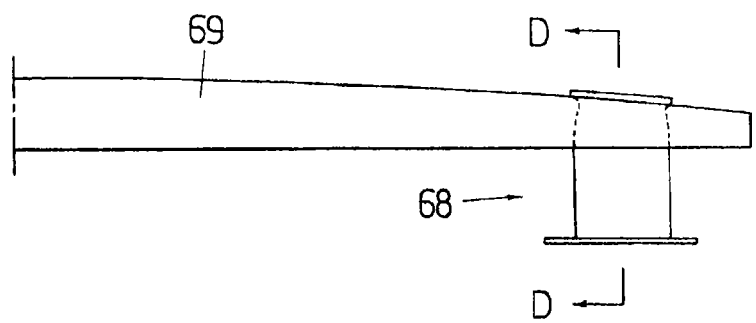
FIGS. 13(a) and 13(b) are a plan view and a sectional view taken along D-D in 13(a) of a bumper structure including a bumper stay and a bumper reinforce according to the present invention, respectively.
Figure 13B:
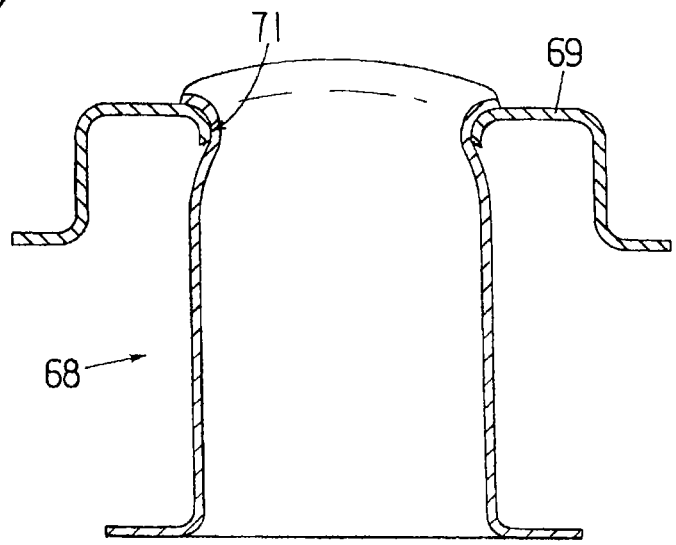

FIG. 13 shows a bumper structure including a bumper stay 68 and a bumper reinforce 69.

The bumper reinforce 69 has a hat-shaped cross section and is made of high-tensile steel or hot-stamp steel. A circular burring hole 71 is formed at each end, and a flange of the hole protrudes toward the side member.

The bumper stay 68 has the same structure as the bumper stay 52 in FIG. 11.

The bumper structure including the bumper stay 68 and the bumper reinforce 69 can be produced as in the same way as the method of producing the bumper structure in FIG. 11.

An electromagnetic tube expansion method according to the present invention will be described below in detail.

To electromagnetically expanding the metal tubular material into the target cross-sectional shape, stretch deformation for varying the circumferential length of the cross section and bend deformation for varying the curvature are required. Commonly, a plastic work load necessary for deformation per unit length in stretch deformation is about 10 to 100 times larger than a plastic work load in bend deformation. Accordingly, less stretch deformation can reduce the plastic work load, reducing energy applied to the electromagnetic molding coil. By forming irregularities on the cross section of the metal tubular material and giving the excessive line length to the circumferential wall so as to bring the circumferential length close to the circumferential length of the target cross-sectional shape, the amount of necessary stretch deformation can be decreased, thereby largely decreasing energy necessary for electromagnetic tube expansion.

Figure 16:
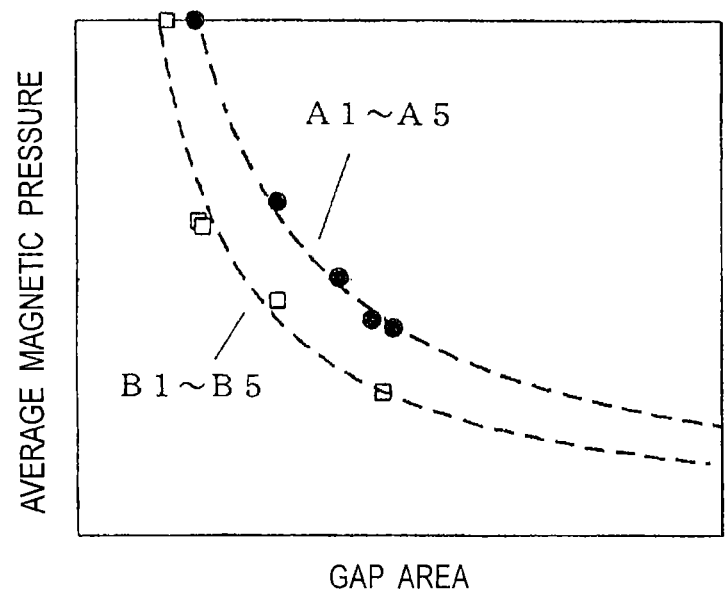
FIG. 16 is a graph showing relationship between an area of gap between a metal tubular material and an electromagnetic molding coil (horizontal axis), and an average value of magnetic pressure generated in the metal tubular material (vertical axis)

However, when the excessive line length is given to the metal tubular material in vain to increase the gap between the electromagnetic molding coil and the tubular material, during electromagnetic molding, a flux leakage between the electromagnetic molding coil and the metal tubular material increases, and a magnetic pressure generating in the metal tubular material decreases. A graph in FIG. 16 shows that the average magnetic pressure generating in the metal tubular material decreases inversely proportional to the area of the gap between the electromagnetic molding coil and the metal tubular material. In FIG. 16, the average magnetic pressure was found by using a simple 3D electromagnetic field analysis program created by the Inventor. As analysis conditions, for ● in FIG. 16, the electromagnetic molding coil is a cylinder of $\phi$82.5 mm, the metal tubular material is A1 to A5 in FIG. 17, the cross-sectional shape (shape of the inner circumferential face of the die) after electromagnetic tube expansion is square of 92×92 mm and corner R of 6 mm, and for □ in FIG. 16, the electromagnetic molding coil is cylinder of $\phi$57 mm, the metal tubular material is B1 to B5 in FIG. 18, and the cross-sectional shape (shape of the inner circumferential face of the die) after electromagnetic molding is rectangle of 65×100 mm and corner R of 6 mm.

Figure 19:
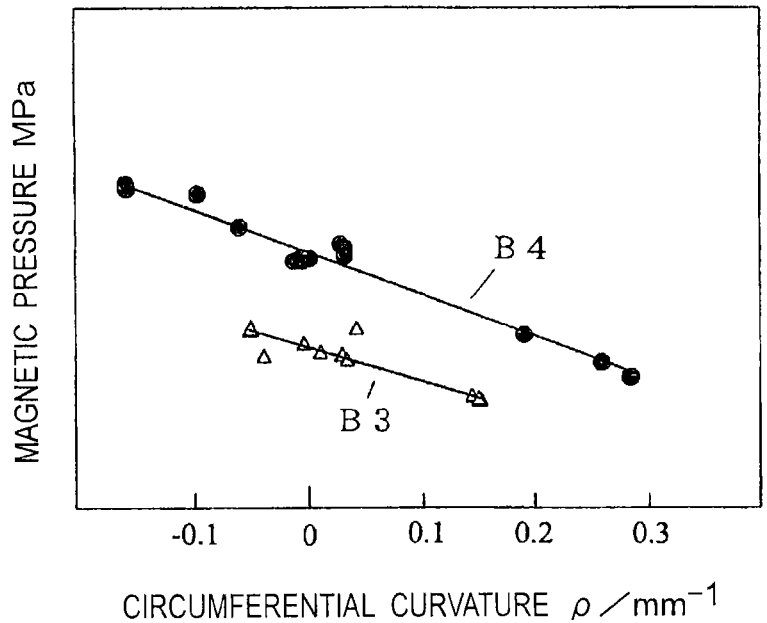
FIG. 19 is a graph showing relationship between a curvature p of a circumferential wall (horizontal axis) and generated magnetic pressure P (vertical axis) in a metal tubular material according to the present invention (B4 in FIG. 18) and a metal tubular material in a comparison example (B3 in FIG. 18)

The magnetic pressure tends to increase in places of the cross section of the circumferential wall of the metal tubular material, which have negative curvature (circumferential curvature), that is, depressions of the cross section, easily deforming the depressions. A graph in FIG. 19 shows that the magnetic pressure generating in the metal tubular material increases when the circumferential curvature of the metal tubular material is negative. The magnetic pressure was found by using the 3D electromagnetic field analysis program. As analysis conditions, for ● in FIG. 19, the metal tubular material is B4 in FIG. 18, and for Δ, the metal tubular material is B3 in FIG. 18, the electromagnetic molding coil is cylinder of $\phi$57 mm, and the cross-sectional shape (shape of the inner circumferential face of the die) after electromagnetic molding is rectangle of 65×100 mm and corner R of 6 mm.

In consideration of the above-mentioned facts, when the metal tubular material is electromagnetically expanded into the target cross-sectional shape, the excessive line length is properly given depending on the cross-sectional shape.

Figure 20:
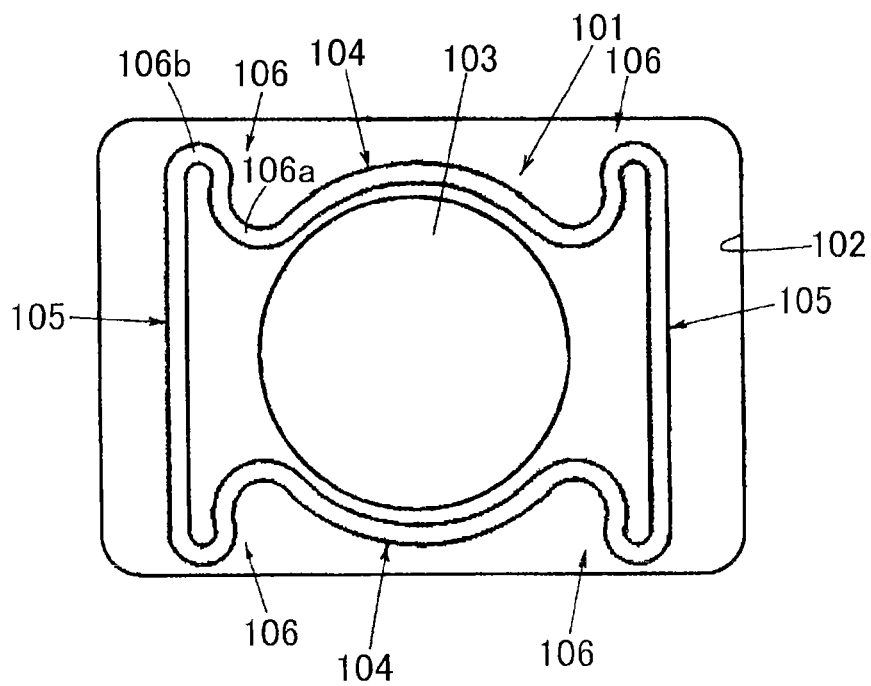
FIG. 20 is a view showing the cross-sectional shape of a metal tubular material and arrangement of the metal tubular material in the die according to the present invention.

FIG. 20 shows the cross-sectional shape of the circumferential wall of a metal tubular material 101 according to the present invention which is suitable for the rectangular (oblong) cross section having an aspect ratio of 1:1.2 or more as the target cross-sectional shape, and arrangement of the metal tubular material 101 in a die 102 (only the inner circumferential face is shown). In FIG. 20, the metal tubular material 101 having the tubular circumferential wall is disposed in the die 102 having the inner circumferential face with the rectangular cross section, and a cylindrical electromagnetic molding coil 103 with a helically wound conductor having a uniform diameter is disposed in the metal tubular material 101.

The inner circumferential face of the die 102 has the substantially same cross-sectional shape in the longitudinal direction (vertical to sheet), and curvature R is formed at each of four corners.

The metal tubular material 101 is formed by cutting, for example, an aluminum alloy extruded material by a predetermined length, and its circumferential wall has the same cross section in the longitudinal direction. The cross section of the circumferential wall of the metal tubular material 101 is shaped like an arc substantially along the curvature of the outer periphery of the electromagnetic molding coil 103, and includes two opposed convex curved regions 104, two opposed nearly linear regions 105 located to rotate from the convex curved regions 104 at 90 degrees, and four irregular regions 106 connecting the convex curved regions 104 to the nearly linear regions 105. The nearly linear regions 105 are rotationally symmetric by 180 degrees and substantially parallel to each other. The irregular regions 106 each include an arc-like depression 106a connected to the convex curved region 104 and an arc-like projection 106b connected to the nearly linear region 105. Through formation of the irregular regions 106, the circumferential wall of the metal tubular material 101 has the excessive line length. Specifically, with reference to FIG. 18, the circumferential wall of R4 (example of the present invention) has a larger circumferential length (outer circumferential length) than B1 (simple circular cross section), that is, has the excessive line length.

In the metal tubular material 101, the convex curved regions 104 are disposed as opposed to long sides of the inner circumferential face of the die 102, and the nearly linear regions 105 are disposed as opposed to short sides of the inner circumferential face of the die 102. The depressions 106a of the irregular regions 106 are disposed as opposed to the long sides of the inner circumferential face of the die 102. The electromagnetic molding coil 103 is sandwiched between the convex curved regions 104 and is located near the convex curved regions 104.

When a current is passed through the electromagnetic molding coil 103 in this state, the metal tubular material 101 is expanded, and the circumferential wall reaches the inner circumferential face (including corners) of the die 102 over the entire circumference to complete tube expansion and mold the rectangular cross-section member having the target cross-sectional shape (the shape along the inner circumferential face of the die 102). The corners of the molded rectangular cross-section member each have the curvature along the inner circumferential face of the die 102.

Through the above-mentioned cross-sectional shape of the metal tubular material 101 and arrangement of the metal tubular material 101 in the die 102, the electromagnetic molding method according to the present invention performs following functions.

In the metal tubular material 101, since the circumferential wall has the excessive line length, and the circumferential length (outer circumferential length) is substantially same or close to the circumferential length of the target rectangular cross section (the shape of the inner circumferential face of the die 102), stretch deformation at electromagnetic molding is decreased. Further, a local decrease in the thickness of the corners can be reduced, preventing breakage. By making the outer circumferential length of the metal tubular material 101 smaller than the outer circumferential length of the target rectangular cross section by 0.5 to 4.0%, a surplus thickness due to stretch deformation can be avoided.

Since the circumferential wall of the metal tubular material 101 is provided with the nearly linear regions 105, and the nearly linear regions 105 are disposed as opposed to the short sides of the die 102, the plastic work load necessary for molding short sides of the rectangular cross-section member can be largely decreased as compared to the metal tubular material having the simple circular cross section.

Since the circumferential wall of the metal tubular material 101 is provided with the convex curved regions 104 that substantially conform to the curvature of the outer periphery of the electromagnetic molding coil 103 and the depressions 106a connected to the convex curved regions 104, irrespective of the long circumferential length, the area of the gap between the metal tubular material 101 and the electromagnetic molding coil 103 can be reduced.

The magnetic pressure exerted onto the four depressions 106a of the circumferential wall of the metal tubular material 101 becomes larger than the magnetic pressure applied onto other regions, and the depressions 106a act on starting points of deformation and therefore, the deformation mode at electromagnetic molding can be easily controlled.

Figure 21:
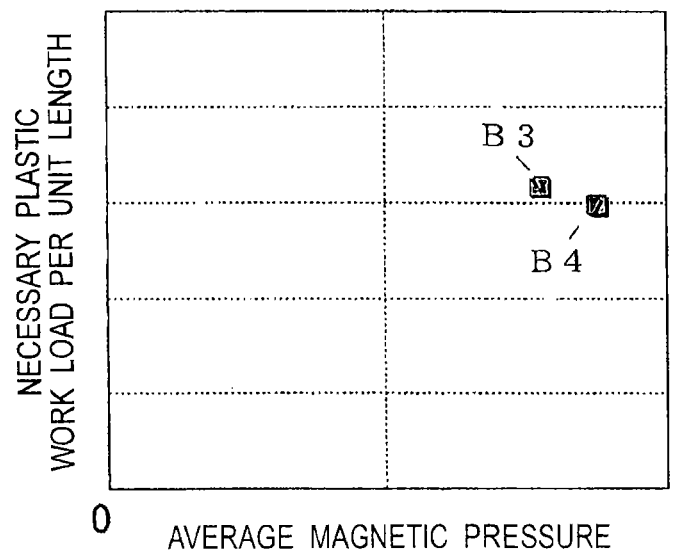
FIG. 21 is a graph showing relationship between generated average magnetic pressure (horizontal axis) and necessary plastic work load per unit length of a circumferential wall (vertical axis) in the metal tubular material according to the present invention (B4 in FIG. 18) and the metal tubular material in the comparison example (B3 in FIG. 18)

In electromagnetic molding of the metal tubular material according to the present invention (B4 in FIG. 18) and the metal tubular material in a comparison example (B3 in FIG. 18) into the rectangular cross section, the average magnetic pressure generating in each of the metal tubular materials and the plastic work load per unit length necessary for molding each of the metal tubular materials were found by using the 3D electromagnetic field analysis program. FIG. 21 shows results. As analysis conditions, the electromagnetic molding coil is cylinder of $\phi 57$ mm, the cross-sectional shape (shape of the inner circumferential face of the die) after electromagnetic molding is rectangle of 65×100 mm and corner R of 6 mm.

As shown in FIG. 21, in the metal tubular material according to the present invention (B4 in FIG. 18), as compared to the metal tubular material in the comparison example (B3 in FIG. 18), the plastic work load necessary for molding is smaller, and the average magnetic pressure exerted onto the cross section is larger, facilitating molding into the target rectangular cross-sectional shape. In the metal tubular material in the comparison example (B3 in FIG. 18) as well, as compared to the simple circular cross section (B1 in FIG. 18) or elliptic cross section (B2 in FIG. 18), the plastic work load necessary for molding is smaller, and the average magnetic pressure exerted onto the cross section is larger.

Next, FIGS. 22 to 25 show other examples of the cross-sectional shape of the circumferential wall of the metal tubular member and arrangement of the member in the die.

Figure 22:
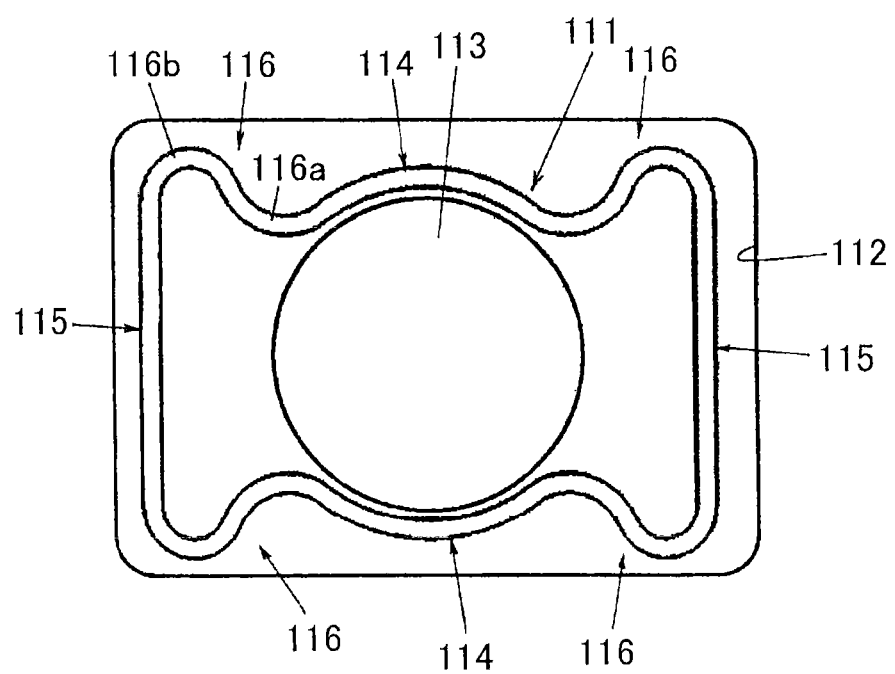
FIG. 22 is a view showing the cross-sectional shape of another metal tubular material and arrangement of the metal tubular material in the die according to the present invention.

Like the metal tubular material 101, the circumferential wall of a metal tubular material 111 shown in FIG. 22 includes two opposed convex curved regions 114, two opposed nearly linear regions 115, and four irregular regions 116 connecting the convex curved regions 114 to the nearly linear regions 115, and is rotationally symmetric by 180 degrees. The convex curved regions 114 are disposed as opposed to long sides of the inner circumferential face of the cross section of a die 112 (only the inner circumferential face is shown), the nearly linear regions 115 are disposed as opposed to short sides of the die 112, and depressions 116a of the irregular regions 116 are disposed as opposed to the long sides of the inner circumferential face of the die 102. However, the curvature radius R of each of the depressions 116a and the projection 116b that constitute the irregular regions 116, in the metal tubular material 111 is larger than the curvature radius R in the metal tubular material 101, and the nearly linear regions 115 are disposed closer to the short sides of the die 112. In FIG. 22, a reference numeral 113 denotes an electromagnetic molding coil. The cross-sectional shape and arrangement of the metal tubular material 111 enable reduction of the plastic work load necessary for molding the short sides of the rectangular cross-section member.

Figure 23:
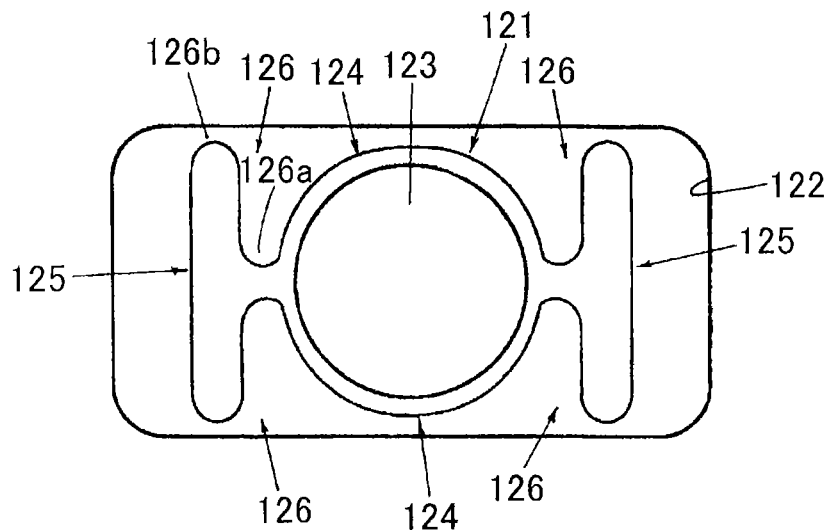
FIG. 23 is a view showing the cross-sectional shape of still another metal tubular material and arrangement of the metal tubular material in the die according to the present invention.

The circumferential wall (only the line of the outer periphery is shown) of the metal tubular material 121 shown in FIG. 23, like the metal tubular material 101, includes two opposed convex curved regions 124, two opposed nearly linear regions 125, and four irregular regions 126 connecting the convex curved regions 124 to the nearly linear regions 125, and is rotationally symmetric by 180 degrees. The convex curved regions 124 are disposed as opposed to long sides of the inner circumferential face of a die 122 (only the inner circumferential face is shown), the nearly linear regions 125 are disposed as opposed to short sides of the cross section of the die 122, and depressions 126a of the irregular regions 126 are disposed as opposed to the long sides of the inner circumferential face of the die 122. However, the metal tubular material 121 has a long circumferential length of the convex curved regions 124. In FIG. 23, a reference numeral 123 denotes an electromagnetic molding coil. With the cross-sectional shape of the metal tubular material 121, the circumferential length of the metal tubular material 121 can be increased to be close to the circumferential length of the inner circumferential face of the die 122 having a large aspect ratio.

Figure 24:
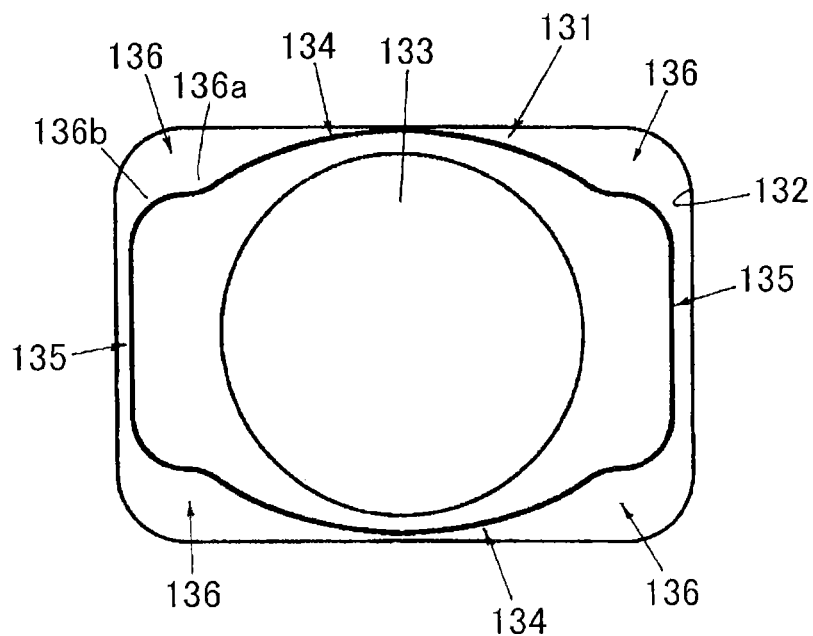
FIG. 24 is a view showing the cross-sectional shape of still another metal tubular material and arrangement of the metal tubular material in the die according to the present invention.

A circumferential wall of a metal tubular material 131 in FIG. 24 (only a line of the outer periphery is shown), like the metal tubular material 101, includes two opposed convex curved regions 134, two opposed nearly linear regions 135, and four irregular regions 136 connecting the convex curved regions 134 to the nearly linear regions 135, and is rotationally symmetric by 180 degrees. The convex curved regions 134 are disposed as opposed to long sides of the inner circumferential face (only the inner circumferential face is shown) of the die 132, the nearly linear regions 135 are disposed as opposed to short sides of the cross section of the die 132, and depressions 136a of the irregular regions 136 are disposed as opposed to the long sides of the inner circumferential face of the die 132. However, in the metal tubular material 131, the convex curved regions 134 each are shaped like an arc substantially along the outer periphery of an electromagnetic molding coil 133, and its curvature is relatively large and the nearly linear region 134 is shorter than that of the metal tubular material 101. In FIG. 24, a reference numeral 133 denotes an electromagnetic molding coil. Since the nearly linear regions 134 of the metal tubular material 131 are short, the area of the gap between the metal tubular material 131 and the electromagnetic molding coil 133 can be reduced.

Figure 25:
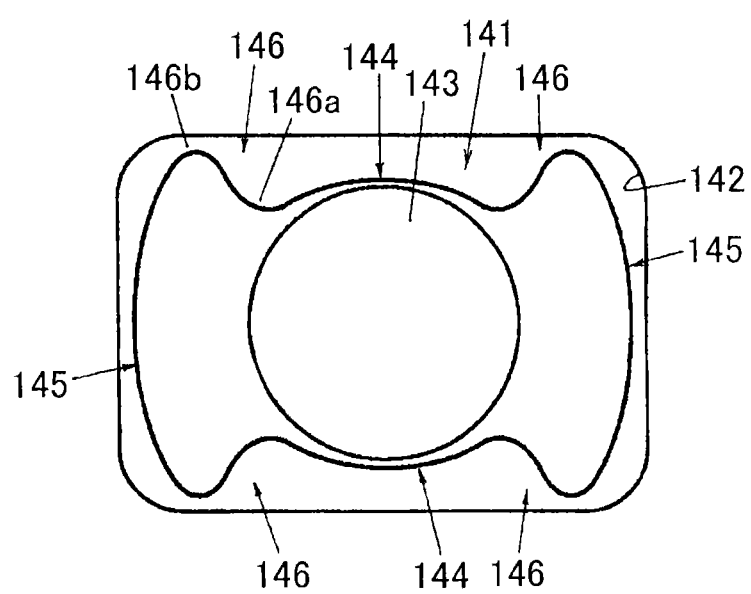
FIG. 25 is a view showing the cross-sectional shape of still another metal tubular material and arrangement of the metal tubular material in the die according to the present invention.

A circumferential wall of a metal tubular material 141 shown in FIG. 25, like the metal tubular material 101, includes two opposed convex curved regions 104, two opposed nearly linear regions 145, and four irregular regions 146 connecting the convex curved regions 104 to the nearly linear regions 145, and is rotationally symmetric by 180 degrees. The convex curved regions 104 are disposed as opposed to long sides of the inner circumferential face of a die 142, the nearly linear regions 145 are disposed as opposed to short sides of the cross section of the die 142, and depressions 146a of the irregular regions 146 are disposed as opposed to the long sides of the inner circumferential face of the die 142. However, the nearly linear regions 145 of the metal tubular material 141 slightly protrude in an arc shape. In FIG. 25, a reference numeral 143 denotes an electromagnetic molding coil. With the cross-sectional shape of the metal tubular material 141, the curvature of the projections 146b of the irregular regions 146 can be reduced, thereby preventing the projections 146b from generating breakage during electromagnetic molding.

Figure 26A:
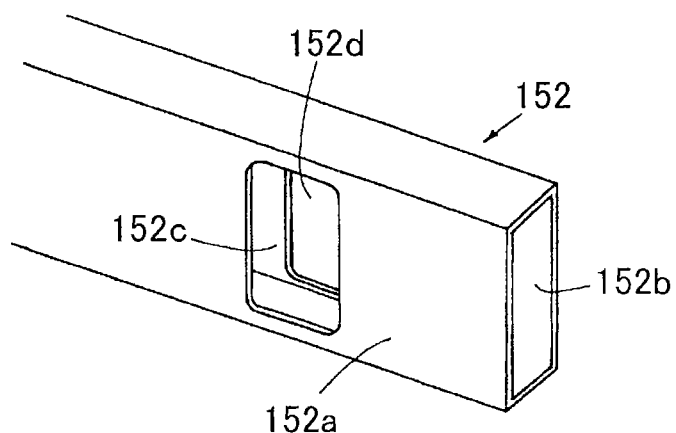
FIGS. 26(a), 26(b), and 26(c) are a perspective view of a bumper reinforce, a front view of a bumper reinforce, and a metal tubular material inserted into a through hole formed in the bumper reinforce, and a side view of 26(b), respectively, for describing the case of applying a method for producing rectangular cross-section member according to the present invention to molding of a bumper stay, and joining of the bumper stay to the bumper reinforce.
Figure 26B:
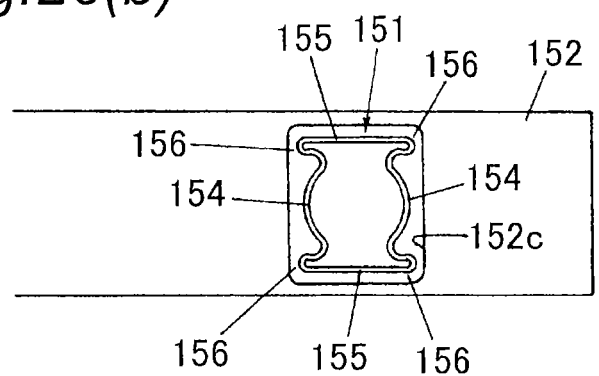
Figure 26C:
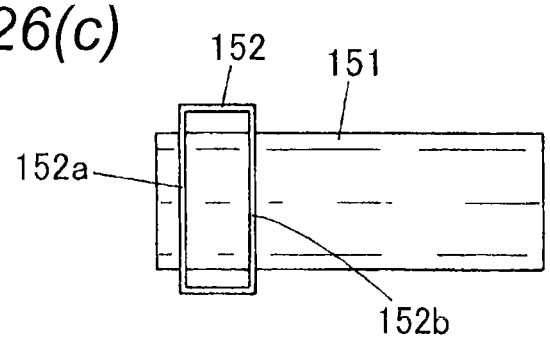
Figure 27:
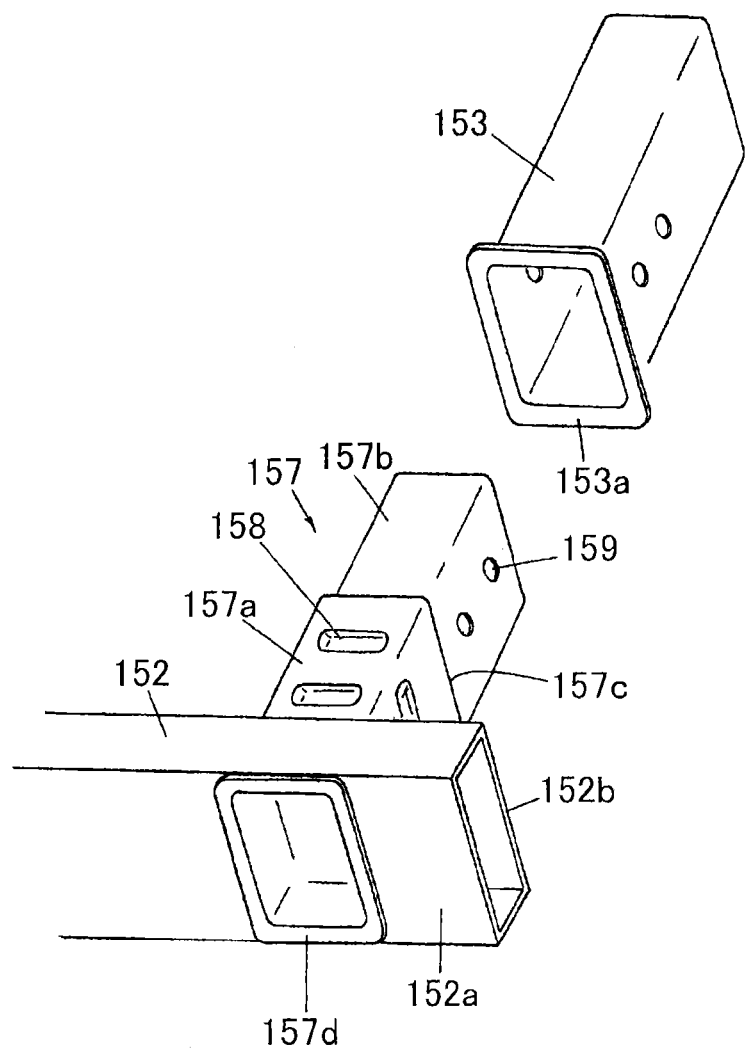
FIG. 27 is a perspective view of a bumper stay, a bumper reinforce, and a side member after electromagnetic molding.

FIGS. 26 and 27 are schematic view for describing a method of molding a rectangular cross-section member (bumper stay) from a metal tubular material by using the electromagnetic molding method according to the present invention, and fixing the bumper stay to a bumper reinforce.

In FIG. 26, a metal tubular material 151 is formed by cutting an aluminum alloy extruded material having a tubular circumferential wall by a predetermined length, and like the metal tubular material 101, the circumferential wall includes two arc-like convex curved regions 156, two nearly linear regions 105, and four irregular regions 156.

A bumper reinforce 152 is formed of an aluminum alloy extruded material having a rectangular cross section, and front and back longitudinal walls 152a and 152b have vertically long rectangular holes 152c and 152d near at right and left ends of the bumper reinforce. The holes 152c and 152d have the substantially same shape as the inner contour (inner circumferential shape) of a cross section of a side member 153 (see FIG. 23). The metal tubular material 151 is inserted into the holes 152c and 152d of the bumper reinforce 152, and its front end protrudes from the hole 152c. The holes 152c and 152d are desirably burring holes. When the front (collision-side) hole 152c is a burring hole, it is desired that the flange of the burring hole protrudes toward the rear side (the side of the side member 153) for the prevention of breakage of a bumper cover at collision (see JP 2010-116129 A).

Subsequently, a die not shown is provided around a rear portion (portion protruding rearward from the hole 152d of the bumper reinforce 152) of the metal tubular material 151, and an electromagnetic molding coil not shown is disposed in the metal tubular material 151.

The die has an inner circumferential face of the rectangular cross section (having the curvature at corners), and includes a small cross-section part, a large cross-section part, and a stepped part therebetween. The shape of the inner circumferential face of the large cross-section part is the substantially same as the outer contour of the cross section of the side member 153. However, a plurality of inwardly-protruding protrusions are appropriately arranged to be formed on the flat face regions (region except for the corners) of the large cross-section part of the die. The protrusions act to form crash beads in the bumper stay. The shape of the inner circumferential face of the small cross-section part is the substantially same as the inner contour (inner circumferential shape) of the cross section of the side member 153. ## The electromagnetic molding coil is the same circular cross-section coil as the electromagnetic molding coil 103.

Subsequently, a current is passed through the electromagnetic molding coil in this state, and the aluminum alloy material 151 is expanded to mold the rectangular cross-section member (bumper stay 157) shown in FIG. 27, and joined to the bumper reinforce 152 at the same time.

The rear portion of the metal tubular material 151 is expanded in the die, and along with the corners, constrained and deformed by the inner circumferential face of the die, and large cross-section part 157a, small cross-section part 157b, and a stepped part 157c therebetween are formed there. The large cross-section part 157a including its corners has the substantially same rectangular cross section as the outer contour of the cross section of the side member 153, and the small cross-section part 157b including its corners has the substantially same rectangular cross section as the inner contour of the cross section of the side member 153. Both of the large cross-section part 157a and the small cross-section part 157b have the rectangular cross section with a small curvature radius R of each corner and clear ridges. Recesses (crash beads 158) corresponding to the protrusions of the die are formed in the flat face regions of the large cross-section part 157a. The crash beads 158, 158 . . . are formed at different axial positions of the adjacent flat face regions, that is, in a staggered pattern.

On the other hand, a front portion (except for the rear portion) of the metal tubular material 151 is expanded within and in front of the bumper reinforce 152, along with its corners, is in close contact with the inner circumferential faces of the holes 152c and 152d of the longitudinal walls 152a and 152b, and is expanded in space between the longitudinal walls 152a and 152h without being constrained by the die, and its front end is expanded to form a flange 157d.

After electromagnetic molding, bolt holes 159 are formed in both side faces of the small cross-section part 157b of the bumper stay 157. Subsequently, the small cross-section part 157b of the bumper stay 157 is inserted into the cross section of the side member 153, the stepped part 157c contacts a flange 153a at the front end of the side member 153, and the small cross-section part 157b is fastened to the side member 153 with bolts, thereby fixing the bumper stay 157 to the side member 153.

Figure 28A:
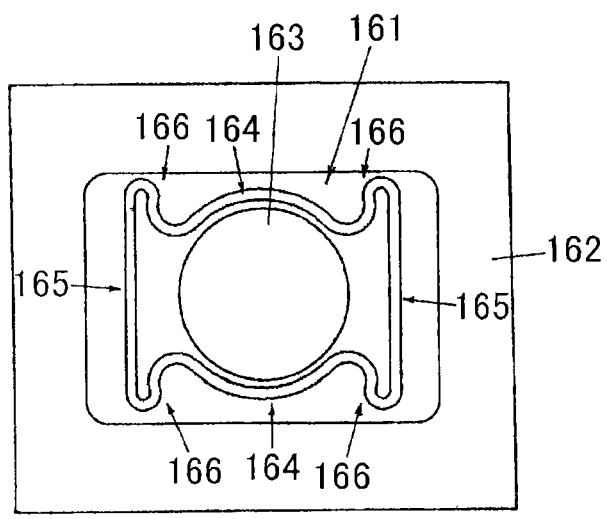
FIGS. 28(a), 28(b), and 28(c) are a plan view and a sectional view of a die, and a metal tubular material and an electromagnetic molding coil that are disposed in the die, and a plan view of a bumper stay with flange formed by electromagnetic molding, respectively, for describing the case of applying a method for producing rectangular cross-section member according to the present invention to molding of the bumper stay with flange.
Figure 28B:
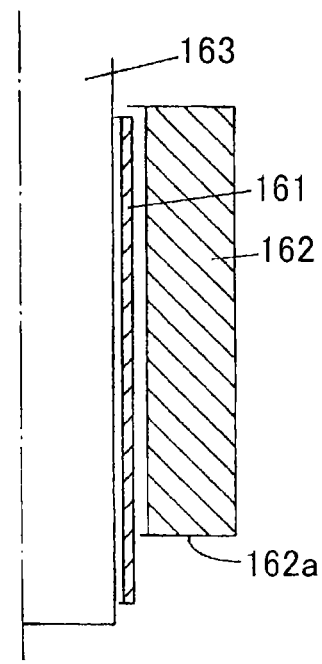

FIG. 28 is a schematic view for describing a method of molding a rectangular cross-section member (bumper stay) with a flange from a metal tubular material by using the electromagnetic molding method according to the present invention.

A metal tubular material 161 is formed by cutting an aluminum alloy extruded material having a tubular circumferential wall by a predetermined length, and like the metal tubular material 101, the circumferential wall includes two arc-like convex curved regions 164, two nearly linear regions 165, and four irregular regions 166.

In electromagnetic molding, the metal tubular material 161 is inserted into a die 162 having the inner circumferential face with the rectangular cross section 01 (corners each have a curvature), one end of the metal tubular material 161 is protruded from one end face 162a of the die 162, and an electromagnetic molding coil 163 is disposed in the metal tubular material 161.

When a current is passed through the electromagnetic molding coil 163 in this state, the metal tubular material 161 is expanded, the circumferential wall in the die 162 reaches the inner circumferential face (including corners) of the die 162 over the entire circumference, and the circumferential wall protruding from the end face 162a of the die 162 is expanded and hits against the end face 162a to finish tube expansion.

Figure 28C:
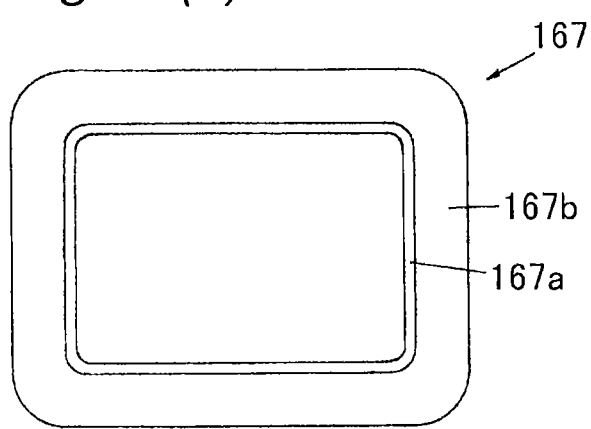

The rectangular cross-section member with flange formed by electromagnetic molding (bumper stay 167) includes, as shown in FIG. 28(c), a rectangular cross-section part 167a and a flange 167b at its end.

Figure 29C:
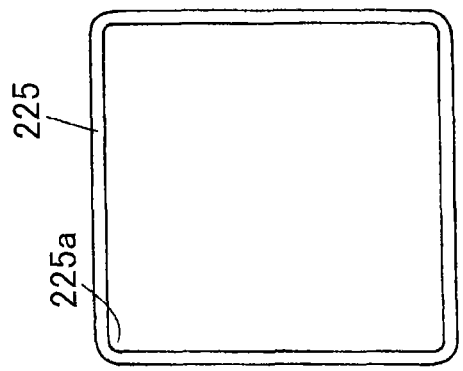
FIGS. 29(a), 29(b), and 29(c) are a plan view of an aluminum alloy material, a plan view of a die, and the aluminum alloy material and an electromagnetic molding coil that are disposed in the die, and a plan view of a polygon cross-section member formed by electromagnetic molding, respectively, for schematically showing an electromagnetic molding method according to the present invention.
Figure 29B:
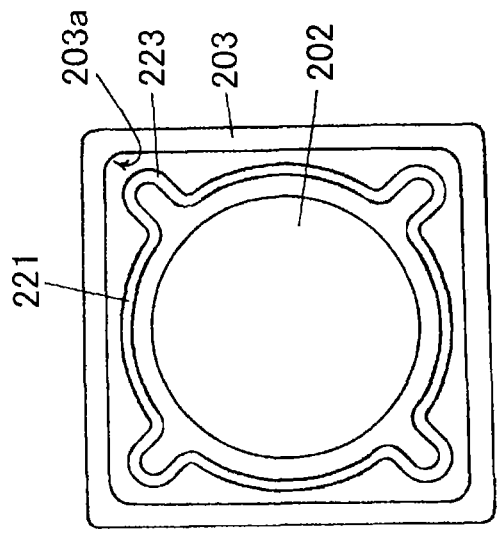
Figure 29A:
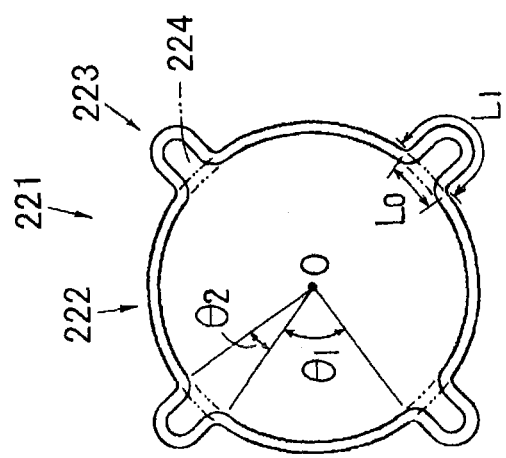
Figure 34A:
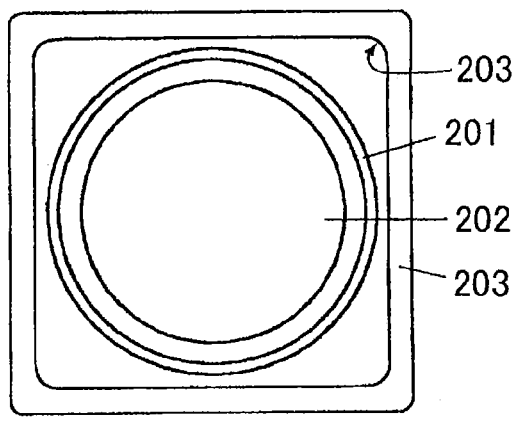
FIGS. 34(a) and 34(b) are a plan view of a die, and an aluminum alloy material and an electromagnetic molding coil that are disposed in the die, and a plan view of a rectangular cross-section member formed by electromagnetic molding, respectively, for schematically describing a conventional electromagnetic molding method for molding the rectangular cross-section member.
Figure 34B:
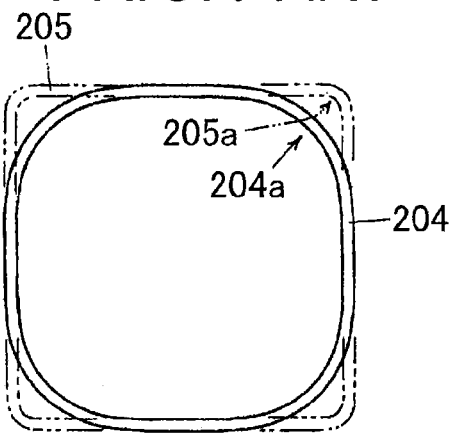

FIG. 29 is a schematic view for describing the electromagnetic molding method according to the present invention. The die 203 and the electromagnetic molding coil 202 are the same as those in FIG. 34.

An aluminum alloy material 221 is formed by cutting an aluminum alloy extruded material having a tubular circumferential wall by a predetermined length, and the circumferential wall includes a plurality of arc-like regions 222 along the circumferential direction and a plurality of irregular regions 223 sandwiched between the arc-like regions 222.

The arc-like regions 222 are disposed along the circumferential direction of a substantially circular basic cross section 224 (expressed by a chain double-dashed line in FIG. 29), and in this example, the central angle of each arc-like region 222 (angle that forms both end of each arc-like region 222 with the center O of the basic cross section 224) is set to $\theta_1$. As described above, the basic cross section 224 is a virtual cross section acquired by connecting the arc-like regions 222, and corresponds to a cross section of the conventional aluminum alloy material 201 (see FIG. 34).

In the irregular regions 223, the circumferential wall protrudes outward from the basic cross section 224. As in the irregular regions 223, like the arc-like regions 222, its central angle (angle that forms both ends of the irregular regions 223 with the center O of the basic cross section 224) is set to $\theta_2$ in this example. With the same central angle $\theta_2$, the length of the circumferential wall in the irregular region 223 (circumferential length) $L_1$ is larger than the length of the circumferential wall of the arc-like region 222 (or the basic cross section 224) (circumferential length) $L_0$ by outwardly-curved portions of the circumferential wall. A difference between the circumferential lengths ($L_1-L_0$) is an excessive line length in the irregular region 223. The excessive line length over the entire cross section of the aluminum alloy material 221 is $4\times(L_1-L_0)$ in this example.

In electromagnetic molding, the aluminum alloy material 221 is disposed in the die 203, and the electromagnetic molding coil 202 is disposed in the aluminum alloy material 221. At this time, the aluminum alloy material 221 is disposed in the die 203 such that the irregular regions 223 are opposed to the respective corners 203a of the die 203.

When a current is passed through the electromagnetic molding coil 202 in this state, the aluminum alloy material 221 is expanded and the circumferential wall reaches the inner circumferential face (including the corners 203a) of the die 203 over the entire circumference to complete tube expansion. In this case, tube expansion of the aluminum alloy material 221 is constrained by the entire circumference of the inner circumferential face of the die 203.

Since the irregular regions 223 each having the excessive line length ($L_1-L_0$) are disposed as opposed to the inner circumferential face of the corners 203a of the die 203, when tube expansion is performed by electromagnetic molding, the circumferential wall of the irregular regions 223 easily reaches the back of the inner circumferential faces of the corners 203a without largely varying the circumferential length, that is, largely decreasing the thickness, to achieve the cross-sectional shape along the inner circumferential face of the die 203, that is, to mold a rectangular cross-section member 225 having small R of each corner 225a and clear ridges.

The rectangular cross-section member 225 is suitable for an energy absorbing member that is crushed and deformed by an axial compressive load to absorb energy. The rectangular cross-section member 225 is a light-weighted energy absorbing member having a good energy absorbing property because a decrease in the thickness of the corners (ridges) that largely contributes to the energy absorbing amount is suppressed.

Figure 30A:
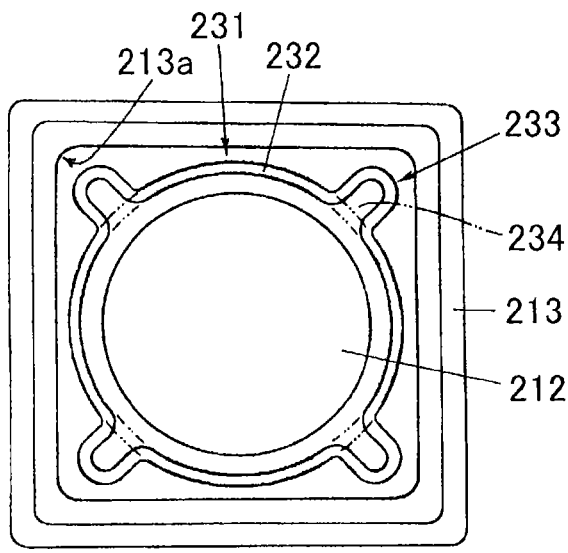
FIGS. 30(a), 30(b), and 30(c) are a plan view and a sectional view of a die, and an aluminum alloy material and an electromagnetic molding coil that are disposed in the die, and a plan view of a polygon cross-section member (bumper stay) formed by electromagnetic molding, respectively, for describing another example of the electromagnetic molding method according to the present invention.
Figure 30B:
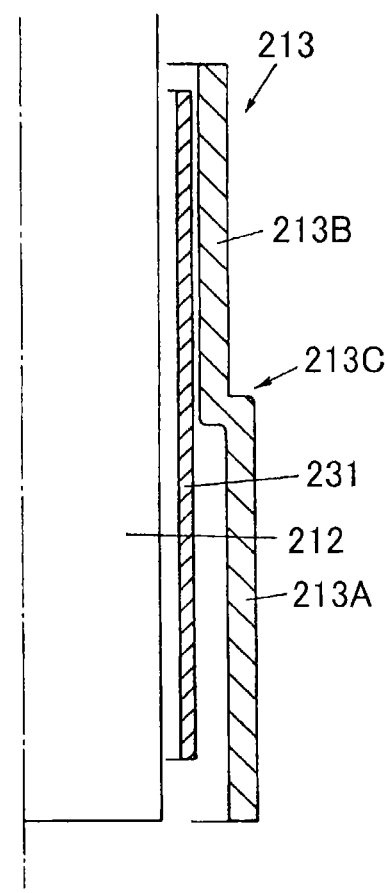
Figure 35A:
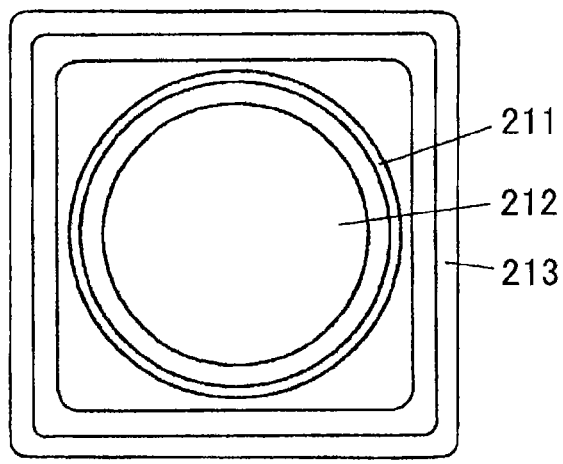
FIGS. 35(a) and 35(b) are a plan view and a sectional view of a die, and an aluminum alloy material and an electromagnetic molding coil that are disposed in the die, respectively, for schematically describing a conventional electromagnetic molding method for molding a rectangular cross-section member (bumper stay)
Figure 35B:
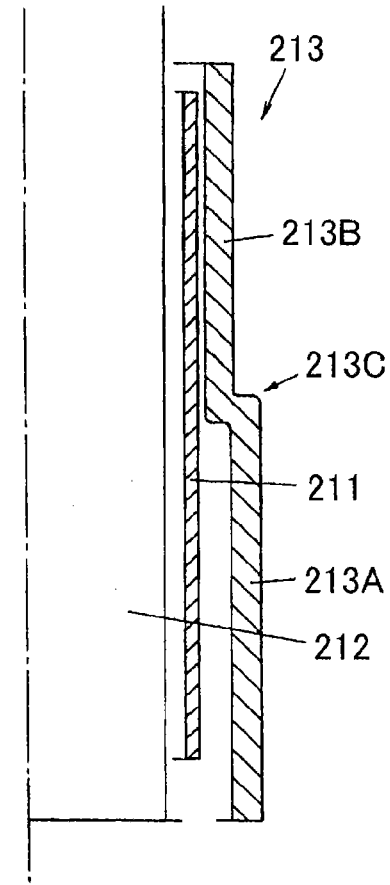

FIG. 30 is a schematic view for describing a method for molding a bumper stay by using the electromagnetic molding method according to the present invention. The electromagnetic molding coil 212 and the die 213 are the same as those in FIG. 35.

Like the aluminum alloy material 221, an aluminum alloy material 231 is formed by cutting an aluminum alloy extruded material having a tubular circumferential wall by a predetermined length, and the circumferential wall includes a plurality of arc-like regions 232 along the circumferential direction and a plurality of irregular regions 233 sandwiched between the arc-like regions 232. The arc-like regions 232 are disposed along the circumferential direction of a substantially circular basic cross section 234 (expressed by a chain double-dashed line in FIG. 30), and in the irregular regions 233, the circumferential wall protrudes outward from the basic cross section 234. Accordingly, the circumferential wall of the irregular regions 233, like the irregular regions 223 of the aluminum alloy material 221, has the excessive line length.

In electromagnetic molding, the aluminum alloy material 231 is disposed in the die 213, and the electromagnetic molding coil 212 is disposed in the aluminum alloy material 231. At this time, the aluminum alloy material 231 is disposed in the die 213 such that the irregular regions 233 are opposed to respective corners 213a of the die 213.

Figure 30C:
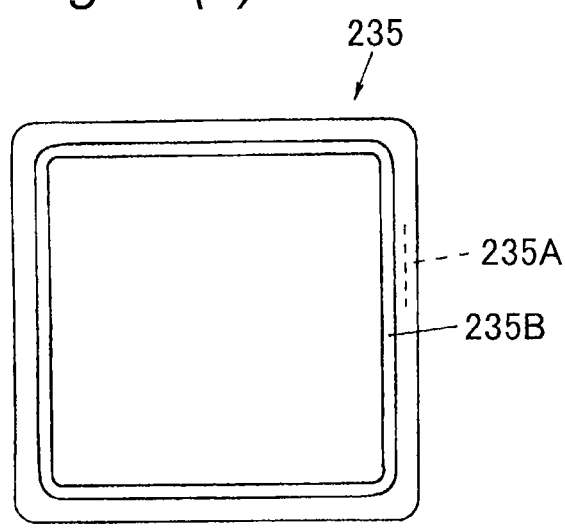

When a current is passed through the electromagnetic molding coil 212 in this state, the aluminum alloy material 231 is expanded, and the circumferential wall reaches the inner circumferential face (including, the corners 213a) of the die 213 over the entire circumference to complete tube expansion. Since the irregular regions 233 each having the excessive line length are disposed as opposed to the inner circumferential faces of the corners of the die 213, when tube expansion is performed by electromagnetic molding, the circumferential wall of the irregular regions 223 easily reaches the back of the corners without largely varying the circumferential length, that is, largely decreasing the thickness, to achieve the cross-sectional shape along the inner circumferential face of the die 213, that is, to mold a bumper stay 235 having small R of the corners and clear ridges as shown in FIG. 30(c).

Figure 36B:
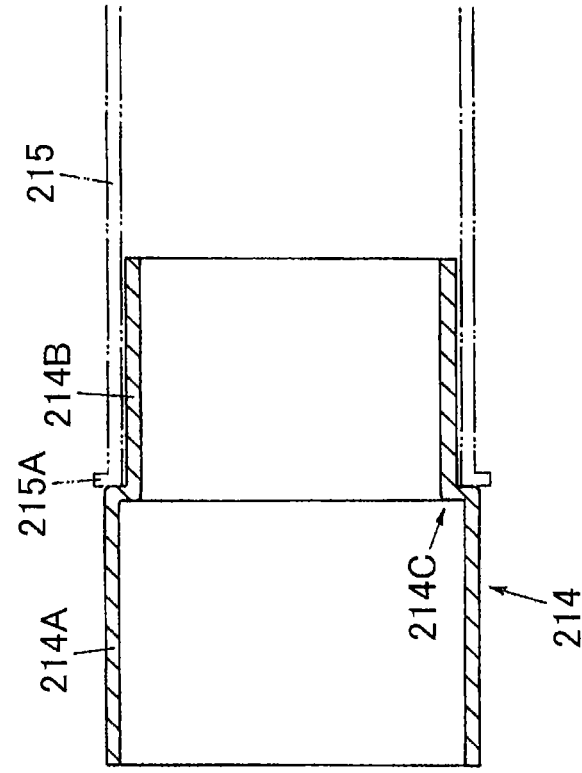
FIGS. 36(a) and 36(b) are a plan view and a sectional view of combination between a rectangular cross-section member (bumper stay) acquired by the conventional electromagnetic molding method and a side member, respectively.
Figure 36A:
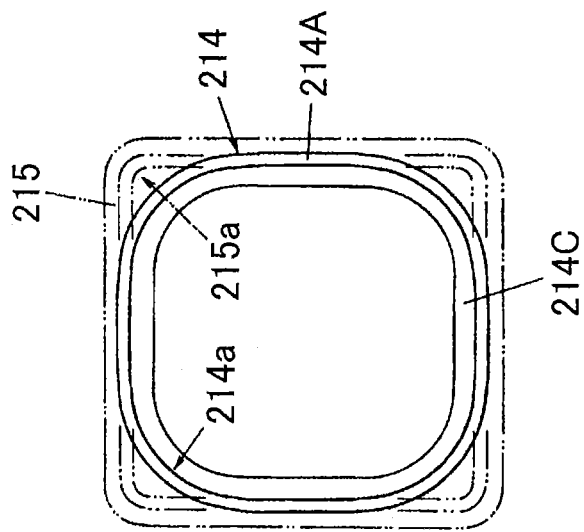

Like the bumper stay 214, the bumper stay 235 is fixed to the side member 215 (see FIG. 36). The cross-sectional shape of a large cross-section part 235A of the bumper stay 235, which includes corners, can substantially coincide with the cross-sectional shape of the side member 215. Accordingly, a load exerted onto the bumper stay 235 at collision is transmitted from the corners of the large cross-section part 235A of the bumper stay 235 as well to the side member 215 via the flange 215A (see FIG. 36), preventing a problem that the deformation mode becomes unstable or the load change due to deformation becomes large as in the bumper stay 214 to fail to ensure a predetermined energy absorbing performance. Further, the bumper stay 235 is a light-weighted bumper stay having a good energy absorbing property as a decrease in the thickness of the corners (ridges) that largely contribute to the energy absorbing amount at crushing and deformation can be suppressed.

On the other hand, the shape of the outer circumferential face of a small cross-section part 235B of the bumper stay 235, which includes corners, can coincide with the shape of the inner circumferential face of the side member 215 (see FIG. 36). Accordingly, the small cross-section part 235B can be inserted into the cross section of the side member 215 without any substantial gap, and by fastening the small cross-section part 235S to the side member 215 from side faces with bolts, the bumper stay 235 can be fixed to the side member 215 more reliably (see FIG. 36).

Figure 31A:
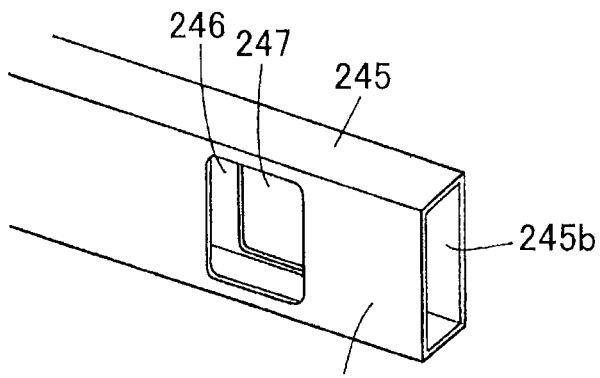
FIGS. 31(a), 31(b), and 31(c) are a perspective view of a bumper reinforce, a front view of the bumper reinforce and an aluminum alloy material inserted into a through hole formed in the bumper reinforce, and a side view of 31(b), respectively, for describing the case of applying the electromagnetic molding method according to the present invention to molding of a bumper stay and joining of the bumper stay to the bumper reinforce.
Figure 31B:
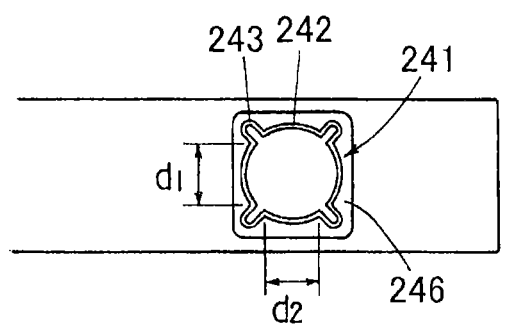
Figure 31C:
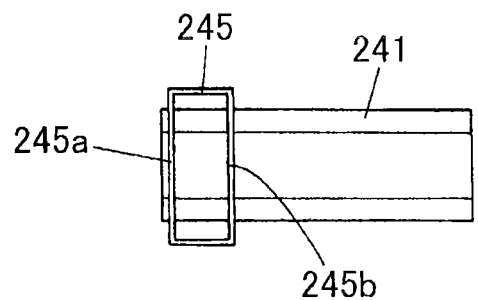

FIG. 31 and FIG. 4 are schematic views for describing a method for molding a bumper stay by using the electromagnetic molding method according to the present invention and fixing the bumper stay to a bumper reinforce.

In FIG. 31, an aluminum alloy material 241 is formed by cutting an aluminum alloy extruded material having a tubular circumferential wall by a predetermined length, and like the aluminum alloy material 231, the circumferential wall includes a plurality of arc-like regions 242 along the circumferential direction and a plurality of irregular regions 243 sandwiched between the arc-like regions 242, and the arc-like regions 242 are disposed along the circumferential direction of the substantially circular basic cross section as described above (not shown). However, since the aluminum alloy material 241 is a rectangle that is vertically larger than the cross-sectional shape of a side member 244 (see FIG. 32), a vertical distance $d_1$ between the irregular regions 243 is set to be slightly larger than a horizontal distance $d_2$ between the irregular regions 243.

A bumper reinforce 245 is formed of an aluminum alloy extruded material having a rectangular cross section, and front and back vertical walls 245a and 245b are provided with vertically long rectangle holes 246 and 247 near at right and left ends of the reinforce 245. The holes 246 and 247 have the substantially same shape as the inner contour of the cross section (inner circumferential shape) of the side member 244. The aluminum alloy material 241 is inserted into the holes 246 and 247 of the bumper reinforce 245, and its front end protrudes from the hole 246.

The holes 246 and 247 are desirably, burring hole. When the front (collision-side) hole 246 is a burring hole, it is desired that the flange of the burring hole protrudes toward the rear side (side of the side member 244) for prevention of breakage of the bumper cover at collision (refer to JP 2010-116129 A).

Subsequently, a die not shown is provided around a rear portion (portion of the bumper reinforce 245, which protrudes rearward from the hole 247) of the aluminum alloy material 241, and an electromagnetic molding coil not shown is disposed in the aluminum alloy material 241.

The die has an inner circumferential face with the rectangular cross section (vertically-long rectangle in this example) and like the die 213, includes a small cross-section part, a large cross-section part, and a stepped part therebetween. The shape of the inner circumferential face of the large cross-section part is the substantially same as the outer contour of the cross section of the side member 244. However, a plurality of inwardly-protruding protrusions are appropriately arranged in flat face regions (regions except for the corners) of the large cross-section part of the die. The protrusions act to form crash beads in the bumper stay. The shape of the inner circumferential face of the small cross-section part is the substantially same as the inner contour of the cross section (inner circumferential shape) of the side member 244.

The electromagnetic molding coil is the same circular cross-section coil as the electromagnetic molding coil 212.

Figure 32:
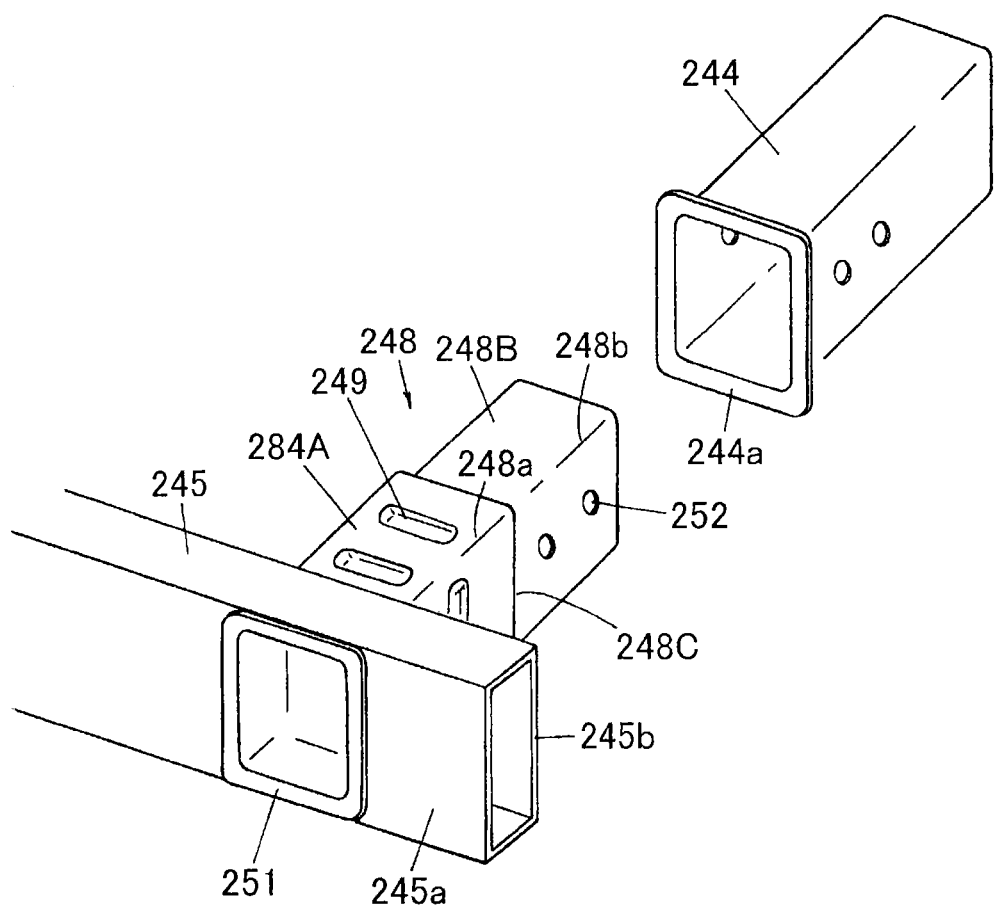
FIG. 32 is a perspective view of a bumper stay, a bumper reinforce, and a side member after electromagnetic molding.

Subsequently, a current is passed through the electromagnetic molding coil in this state, and the aluminum alloy material 241 is expanded to mold a bumper stay 248 shown in FIG. 32 and join the bumper stay 248 to the bumper reinforce 245 at the same time.

The rear portion of the aluminum alloy material 241 is expanded in the die, and along with its corners, is deformed by being constrained by the inner circumferential face of the die, and a large cross-section part 248a, a small cross-section part 248b, and a stepped part 248c therebetween are formed there. The large cross-section part 248a including corners 248a has the rectangular cross section having the substantially same shape as the outer contour of the cross section of the side member 244, and the small cross-section part 248b including corners 248b has the rectangular cross section having the substantially same shape as the inner contour of the cross section of the side member 244. The large cross-section part 248a and the small cross-section part 248b have the rectangular cross section having small R of the corners 248a and 248b and clear ridges. Further, recesses (crash beads 249) corresponding to the protrusions of the die are formed in the flat face regions of the large cross-section part 248a. The crash beads 249, 249 . . . are formed at different axial positions of the adjacent flat face regions, that is, in a staggered pattern.

On the other hand, a front portion (portion other than the rear portion) of the aluminum alloy material 241 expands within and in front of the bumper reinforce 245, along with its corners, is in close contact with the inner circumferential faces of the holes 246 and 247 of the vertical walls 245a and 245b, and is expanded in space between the vertical walls 245a and 245b without being constrained by the die, and its front end is expanded to form a flange 51.

After electromagnetic molding, bolt holes 252 are formed on both side faces of the small cross-section part 248b of the bumper stay 248. Subsequently, the small cross-section part 248b of the bumper stay 248 is inserted into the cross section of the side member 244, the stepped part 248c contacts a flange 244a at the front end of the side member 244, and the small cross-section part 248b is fastened to the side member 244 with bolts, thereby fixing the bumper stay 248 to the side member 244.

Figure 33A:
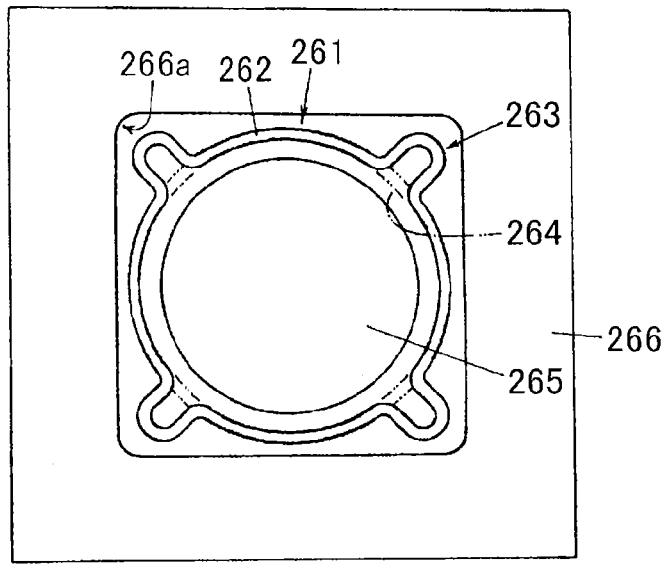
FIGS. 33(a), 33(b), and 33(c) are a plan view and a sectional view of a die, and an aluminum alloy material and an electromagnetic molding coil that are disposed in the die, and a plan view of a polygon cross-section member (bumper stay) formed by electromagnetic molding, respectively, for describing still another example of the electromagnetic molding method according to the present invention.
Figure 33B:
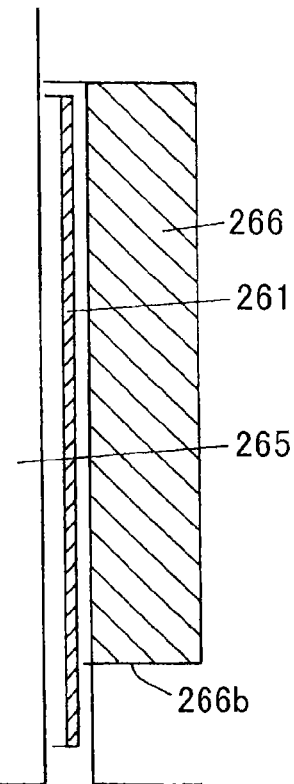

FIG. 33 is a schematic view for describing a method for molding a bumper stay with flange by using the electromagnetic molding method according to the present invention.

Like the aluminum alloy material 221, an aluminum alloy material 261 is formed by cutting an aluminum alloy extruded material having a tubular circumferential wall by a predetermined length, and the circumferential wall includes a plurality of arc-like regions 262 along the circumferential direction and a plurality of irregular regions 263 sandwiched between the arc-like regions 262. The arc-like regions 262 are disposed along the circumferential direction of a substantially circular basic cross section 264 (expressed by a chain double-dashed line in FIG. 33), and in the irregular regions 263, the circumferential wall protrudes outward from the basic cross section 264. Accordingly, the circumferential wall of the irregular regions 263, like the irregular regions 223 of the aluminum alloy material 221, has the excessive line length.

In electromagnetic molding, the aluminum alloy material 261 is inserted into a die 266, one end of the aluminum alloy material 261 is protruded from one end face 266b of the die 266, and an electromagnetic molding coil 265 is disposed in the aluminum alloy material 261. At this time, the aluminum alloy material 261 is disposed in the die 266 such that the irregular regions 263 are opposed to respective corners 266a of the die 266.

When a current is passed through the electromagnetic molding coil 265 in this state, the aluminum alloy material 261 is expanded, the circumferential wall reaches inner circumferential face (including the corner 266a) of the die 266 over the entire circumference, and in a portion of the die 266, which protrudes from the end face 266b, the circumferential wall is expanded to hit against the end face 266b to complete tube expansion.

Figure 33C:
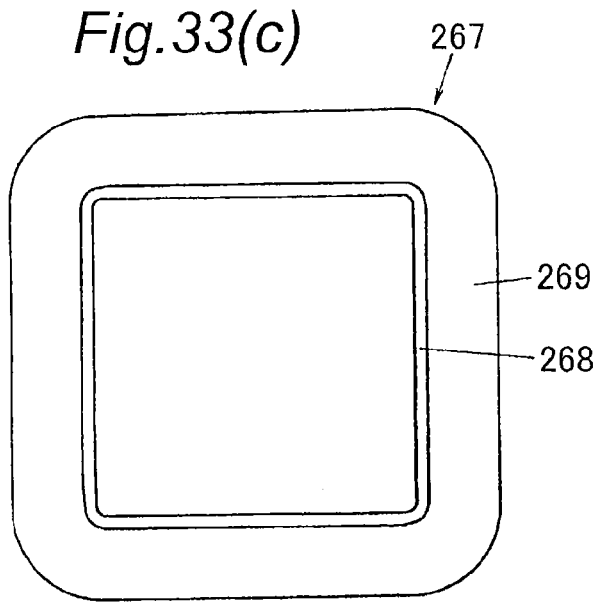

As shown in FIG. 33(c), a bumper stay 267 with flange, which is acquired by electromagnetic molding, includes a rectangular cross-section part 268 and a flange 269 at an end. Since the irregular regions 263 having the excessive line length are disposed as opposed to the corners 266a of the die 266, when tube expansion is performed by electromagnetic molding, the circumferential wall of the irregular regions 263 can easily reach the back of the corners 266a without largely varying the circumferential length, that is, largely decreasing the thickness, to achieve the cross-sectional shape along the inner circumferential face of the die 266, that is, to mold a bumper stay 267 having the rectangular cross-section part 268 that has small R of the corners and clear ridges as shown in FIG. 33(c). Simultaneously, the excessive line length can alleviate a local decrease in the thickness of the flange 269, preventing breakage.

In the method for producing the polygon cross-section member according to the present invention, the aluminum alloy material can be embodied as follows.

(1) Although the irregular regions of the aluminum alloy material in the above-mentioned example each have one projection, a plurality of projections, or one or more depressions (portions of the circumferential wall, which protrude inward from the basic cross section) may be provided in each irregular region, or both the projection and depression may be provided in a waveform pattern in each irregular region. In either case, the irregular regions must have the excessive line length.

(2) In the case where a plurality of irregular regions are present in the aluminum alloy material, the shape of the depression or projection, or the excessive line length of each irregular region are not necessarily uniform, and may be appropriately adapted depending on the shape of the polygon cross-section member molded by electromagnetic molding.

It is desired to form the same number of irregular regions of the aluminum alloy material as the number of corners (ridges) of the polygon cross-section member molded by electromagnetic molding and however, it is not necessary to provide the irregular region at a place where a change in the circumferential length of the aluminum alloy material (material extension) is small at electromagnetic molding (for example, a place where the angle of the corner of the polygon cross-section member is relatively large).

(3) The aluminum alloy desirably has a conductivity of 20% IACS or more at electromagnetic molding and a proof stress of 150 MPa or less, and is selected among JIS1000, 3000, 5000, 6000, 7000-type aluminum alloys. In the case of heat-treatment aluminum alloy, an aluminum alloy material in a T1 or T4 state, or an aluminum alloy material softened by whole or local restoring treatment may be used. In this case, age hardening treatment (T5 and T6 treatment) may be performed after electromagnetic molding, and in the examples of FIG. 31 and FIG. 32, the age hardening treatment is performed after joining of the bumper stay 248 to the bumper reinforce 245.

(4) Given that the outer circumferential length of the aluminum alloy material is Lb, and the circumferential length of the inner circumferential face of the die that constrains deformation of the aluminum alloy material at electromagnetic molding is La, La/Lb is set to be larger than 0.9 and is smaller than 1.3. When La/Lb is 0.9 or less, wrinkles generate on the electromagnetically molded polygon cross-section member, and when La/Lb is 1.3 or more, the material can break. Desirably, La is the substantially same as Lb.

(5) The thickness of the aluminum alloy material is not necessarily uniform over the entire circumference, and may be varied in the circumferential direction. For example, (a) locations that are less prone to apply the molding force of the electromagnetic molding coil (locations away from the center O), that is, the irregular regions and their surroundings as needed are made thinner, (b) in producing the energy absorbing member, conversely, the irregular regions corresponding to corner (ridges) that largely contributes to energy absorption, and their surroundings as needed are made thicker, (c) in molding the polygon cross-section member with flange by electromagnetic molding, the expected bolt fastening locations are made thicker.

(6) Although the aluminum alloy material for electromagnetic molding in the above-mentioned example is formed merely by cutting the extruded material, a previously processed aluminum alloy material may be used (see FIG. 16 in JP 2010-116129 A). For example, in the example shown in FIGS. 32 and 33, before expansion into the polygon cross section by electromagnetic molding, the flange may be separately molded by electromagnetic molding or press-molding.

(7) A metal plate shaped into a tube by press-molding or roll-molding may be used as the aluminum alloy material.

The invention claimed is:

1. A method for producing an energy absorbing member, said method comprising providing a tubular material including a circumferential wall undulating in a wave form pattern in the circumferential direction, a circumferential length equivalent circle diameter of the outer periphery of the circumferential wall being larger than the diameter of a min circumscribed circle, expanding by plastic working the entire circumference of an end of the circumferential wall of the tubular material to form a flange, thereby producing the energy absorbing member including an axial part having a tubular circumferential wall undulating in a waveform pattern in the circumferential direction and the flange.

2. The method for producing the energy absorbing member according to claim 1, wherein the circumferential length equivalent circle diameter of the outer periphery of the circumferential wall of the axial part is larger than the diameter of the minimum circumscribed circle.

3. The method for producing the energy absorbing member according to claim 1, wherein the metal molding material is an aluminum alloy extruded material, and optionally the whole or a part of the plastic working is implemented by electromagnetic molding.

4. The method for producing the energy absorbing member according to claim 3, wherein the circumferential wall of the metal molding material is expanded outward by the electromagnetic molding to form a plurality of outwardly-expanding crash beads on the circumferential wall of the axial part.

5. The method for producing the energy absorbing member according to claim 1, wherein the energy absorbing member is a bumper stay.

6. An electromagnetic molding method for producing a rectangular cross-section member comprising:

disposing a metal tubular material having a tubular circumferential wall in a die having a substantially rectangular cross section with an inner circumferential face of an aspect ratio of 1:1.2 or more;

disposing a cylindrical electromagnetic molding coil with a helically wound conductor in the metal tubular material; and passing a current through the electromagnetic molding coil in this state to expand the metal tubular material into a cross-sectional shape along the inner circumferential face of the die, wherein the cross section of the circumferential wall of the metal tubular material includes two opposed convex curved regions, two opposed nearly linear regions, and four irregular regions connecting the convex curved regions to the nearly linear regions, the convex curved regions being arranged substantially along the curvature of the periphery of the electromagnetic molding coil, wherein the irregular regions each have a depression connected to the convex curved region and a projection connected to the nearly linear region, the convex curved regions are disposed as opposed to long sides of the cross section of the die, and wherein the nearly linear regions are disposed as opposed to short sides of the cross section of the die.

7. The electromagnetic molding method for producing a rectangular cross-section member according to claim 6, wherein the metal mate expanded, and one or both ends of the metal material re expanded outward at the same time to mold a flange.

8. The electromagnetic molding method for producing a rectangular cross-section member according to claim 6, wherein the rectangular cross-section member is an energy absorbing member, and the metal material is expanded, and a plurality of inwardly-recessed crash beads are formed in the circumferential wall at the same time.

9. The method for producing the rectangular cross-section member according to claim 8, wherein the rectangular cross-section member is a bumper stay.

10. The electromagnetic molding method for producing a rectangular cross-section member according to claim 9, wherein a bumper reinforce has a hole penetrating in the forward and rearward direction, and
part of the metal material is inserted into the hole,
a portion of the metal material, which protrudes rearward from the hole, is surrounded with the die, and
electromagnetic molding is performed to join the metal material to the bumper reinforce.

11. An electromagnetic molding method for producing a polygon cross-section member comprising:

disposing an aluminum alloy material having a tubular circumferential wall in a die having an inner circumferential face with a polygon cross section;

disposing an electromagnetic molding coil in the aluminum alloy material; and passing a current through the electromagnetic molding coil in this state to expand the aluminum alloy material into a cross-sectional shape along the inner circumferential face of the die, wherein the cross section of the circumferential wall of the aluminum alloy material includes a plurality of arc-like regions along the circumferential direction of a substantially circular basic cross section and a plurality of irregular regions sandwiched between the arc-like regions, the circumferential wall in the irregular regions protrudes inward or/and outward from the basic cross section, the circumferential length of the circumferential wall in each irregular region is longer as compared to the case where the region is shaped like an arc along the circumferential direction of the basic cross section, and the aluminum alloy material is disposed such that the irregular regions are opposed to respective corners of the die.

12. The electromagnetic molding method for producing a polygon cross-section member according to claim 11, wherein the electromagnetic molding coil is a circular cross-section coil with a helically wound conductor.

13. The electromagnetic molding method for producing a polygon cross-section member according to claim 11, wherein the aluminum alloy material is expanded, and one or both of ends of the aluminum alloy material is expanded outward to form a flange at the same time.

14. The electromagnetic molding method for producing a polygon cross-section member according to claim 11, wherein the polygon cross-section member is an energy absorbing member, the aluminum alloy material is expanded, and wherein a plurality of inwardly-recessed crash beads are formed in the circumferential wall at the same time.

15. The method for producing the polygon cross-section member according to claim 14, wherein the polygon cross-section member is a bumper stay.

16. The electromagnetic molding method for producing a polygon cross-section member according to claim 15, wherein a bumper reinforce has a hole penetrating in the forward and rearward direction, part of the aluminum alloy material is inserted into the hole,
a portion of the aluminum alloy material, which protrudes rearward from the hole, is surrounded with the die, and
electromagnetic molding is performed to join the aluminum alloy material to the bumper reinforce.

17. An energy absorbing member produced by the method of claim 1, comprising:
- an axial part having a tubular circumferential wall undulating in a waveform pattern in the circumferential direction; and
- one or two flanges formed by expanding the entire circumference of one or both ends of the circumferential wall of the metal material, wherein
- said energy absorbing member is molded from a tubular material comprising a circumferential wall undulating in a waveform pattern in the circumferential direction, a circumferential length equivalent circle diameter of the outer periphery of the circumferential wall being larger than a diameter of a minimum circumscribed circle.

18. The energy absorbing member according to claim 17, wherein the circumferential length equivalent circle diameter of the outer periphery of the circumferential wall of the axial part is larger than the diameter of the minimum circumscribed circle.

19. The energy absorbing member according to claim 18, wherein a cross-sectional shape of the circumferential wall of the axial part is substantially the same as a cross-sectional shape of the circumferential wall of the metal molding material.

20. The energy absorbing member according to claim 17, wherein the metal molding material is an aluminum alloy extruded material.

21. The energy absorbing member according to claim 17, wherein a plurality of outwardly-expanding crash beads are formed on the circumferential wall of the axial part.

22. The energy absorbing member according to claim 17, wherein the energy absorbing member is a bumper stay.

\* \* \* \* \*